US008509833B2

(12) United States Patent
Tavildar et al.

(10) Patent No.: US 8,509,833 B2
(45) Date of Patent: Aug. 13, 2013

(54) METHOD AND APPARATUS FOR USING AND/OR IMPLEMENTING CONTROL CHANNELS IN WHITE SPACE

(75) Inventors: Saurabh Tavildar, Jersey City, NJ (US); Junyi Li, Chester, NJ (US); Adnan Raja, Champaign, IL (US); Nilesh Khude, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 12/822,677

(22) Filed: Jun. 24, 2010

(65) Prior Publication Data
US 2011/0319114 A1 Dec. 29, 2011

(51) Int. Cl.
*H04J 1/16* (2006.01)
*H04J 3/14* (2006.01)
*H04L 1/00* (2006.01)
*H04L 12/26* (2006.01)
*H04B 7/00* (2006.01)

(52) U.S. Cl.
USPC ........... 455/514; 455/522; 370/328; 370/318; 370/329; 370/252; 370/235; 370/250; 370/331; 370/337; 370/338

(58) Field of Classification Search
USPC ................. 455/514, 522; 370/328, 318, 329, 370/252, 235, 250, 331, 337, 338
See application file for complete search history.

(56) References Cited

U.S. PATENT DOCUMENTS

| | | | |
|---|---|---|---|
| 7,756,058 B2 * | 7/2010 | Cordeiro et al. | 370/252 |
| 8,199,707 B2 * | 6/2012 | Hu | 370/329 |
| 8,363,602 B2 * | 1/2013 | Junell et al. | 370/328 |
| 8,374,140 B2 * | 2/2013 | Hu | 370/329 |
| 8,385,286 B2 * | 2/2013 | Junell et al. | 370/329 |
| 8,391,225 B2 * | 3/2013 | Hu | 370/329 |
| 2007/0223419 A1 * | 9/2007 | Ji et al. | 370/329 |
| 2007/0249341 A1 * | 10/2007 | Chu et al. | 455/434 |
| 2007/0280163 A1 * | 12/2007 | Zhang | 370/331 |
| 2008/0253341 A1 * | 10/2008 | Cordeiro et al. | 370/338 |
| 2008/0253347 A1 * | 10/2008 | Cordeiro et al. | 370/343 |
| 2008/0285525 A1 * | 11/2008 | Hu | 370/337 |
| 2008/0298310 A1 | 12/2008 | Hu | |
| 2009/0279491 A1 * | 11/2009 | Kim et al. | 370/329 |

OTHER PUBLICATIONS

International Search Report and Written Opinion—PCT/US2011/041882—ISA/EPO—Oct. 25, 2011.

* cited by examiner

*Primary Examiner* — Bobbak Safaipour
(74) *Attorney, Agent, or Firm* — James K. O'Hare

(57) ABSTRACT

Methods and apparatus related to control channels in a wireless communications system are described. Different white space bands may be available at different locations. A wireless terminal monitors control information from multiple potentially available communications channels. Control time slots corresponding to some different channels are intentionally time offset from one another. Some embodiments implement predetermined control slot timing synchronized with respect to an external timing source. In other embodiments, a wireless terminal selects a control time slot on a new channel as a function of control slot timing on channels already in use. A wireless terminal selects one of a plurality of communications channels for use in communicating information and determines a position of a control time slot to be used on the selected communications channels. The wireless terminal uses the control time slot on the selected communications channel to transmit and receive control information.

20 Claims, 19 Drawing Sheets

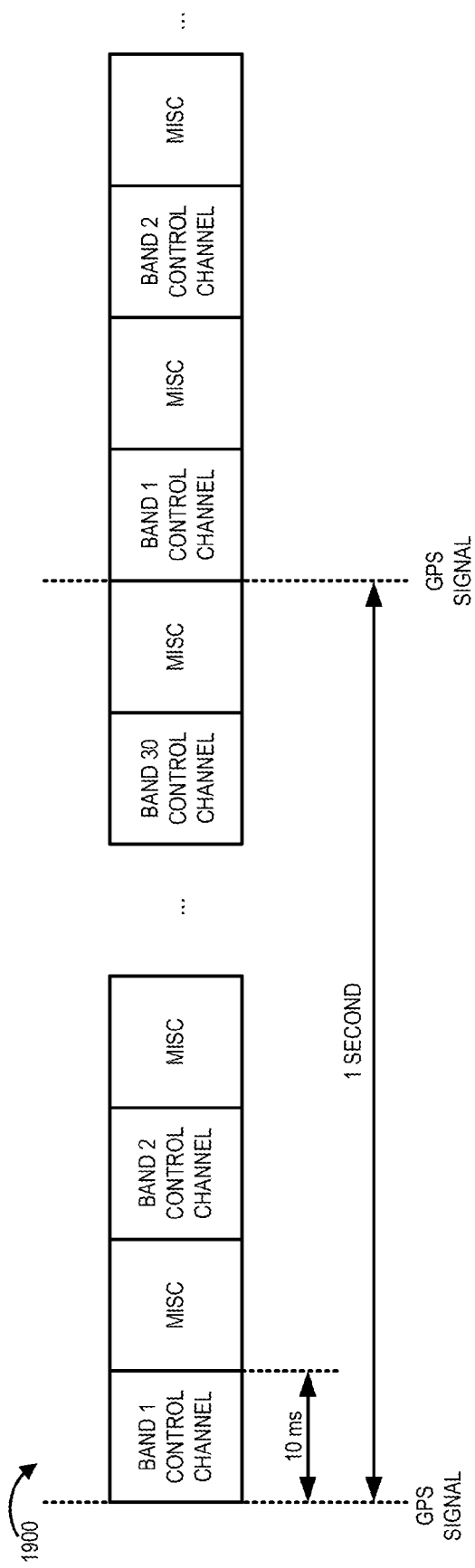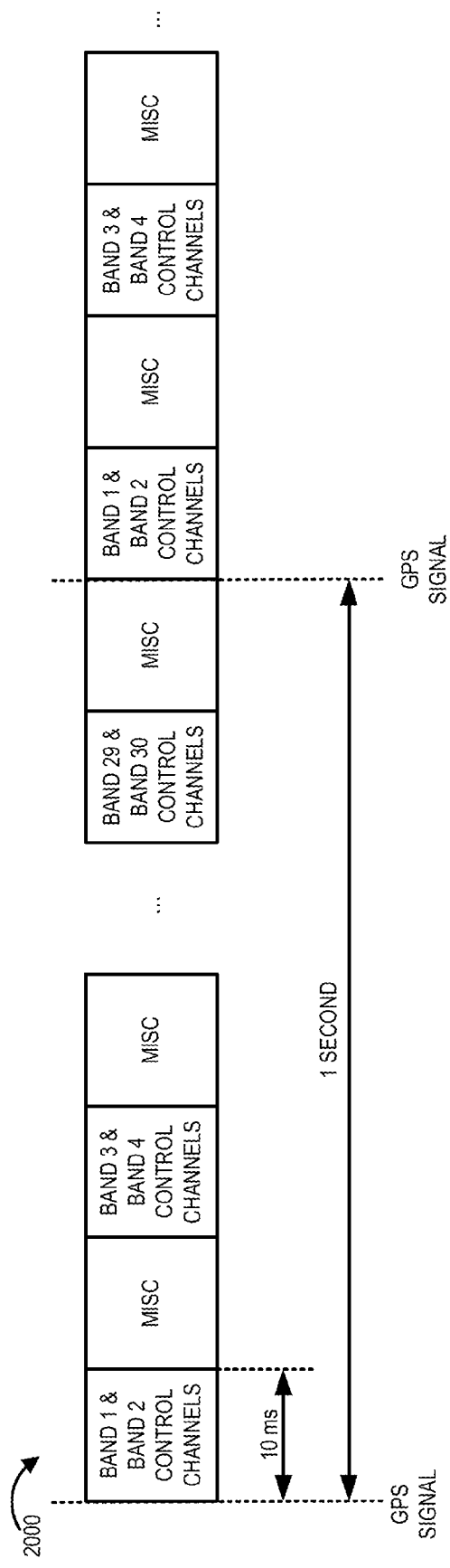

METHOD AND APPARATUS FOR USING AND/OR IMPLEMENTING CONTROL CHANNELS IN WHITE SPACE

FIELD

Various embodiments relate to wireless communications, and more particularly, to methods and apparatus related to monitoring, implementing and/or using control channels.

BACKGROUND

The FCC is allowing unused TV bands to be used for other purposes, e.g., for communications use by local wireless peer to peer networks. At different locations different unused TV bands may be available for use concurrently, e.g., at a given time. At a particular location multiple alternative unused TV bands may be available for use. The available bands, at a particular location, may include bands which are physically discontiguous from one another. The total bandwidth which includes the set of each of the potentially available bands at a particular location may be large. In some situations, because of the discontinuities, large total bandwidth, and/or device receiver limitations, simultaneously receiving on each of the different possible TV bands may not be feasible for a wireless communications device. For example, a device may not be able to monitor multiple disjoint bands at the same time, e.g., because monitoring a large bandwidth including multiple disjoint bands might require the use of too much power and/or processing resources. While being able to monitor multiple disjoint bands continuously would be beneficial, it is not practical in many cases given receiver constraints. However, it should be appreciated that if a wireless communications device were able to monitor several bands, whether they are disjoint or contiguous, at least for control information this would facilitate a device's ability to make a band selection decision, e.g., based on loading, technologies in use, devices present, etc.

Based on the above discussion, there is a need for new methods and apparatus for implementing, determining, selecting and/or using control channels corresponding to multiple channels in a way that facilitates detection of control signals on multiple channels by devices.

SUMMARY

Methods and apparatus related to control channels in a wireless communications system are described. Various described methods and apparatus are well suited for use in a wireless communications system in which different bands may be available at different locations, e.g., different unused TV bands may be available at different locations for use by local peer to peer networks. In some embodiments, a wireless communications device monitors multiple potentially available TV bands in a time multiplexed way. In some embodiments, control channel information is transmitted in time orthogonal durations corresponding to different frequency bands.

In some embodiments, a predetermined recurring timing structure is implemented and used which offsets control time slots from one another corresponding to different channels. In various embodiments, the recurring timing structure is synchronized with respect to an external timing source, e.g., GPS timing. In some embodiments, a wireless communications device acquires control slot timing with regard to multiple channels based on a received timing signal in combination with stored information and/or in combination with received channel information.

In some embodiments, the control slot timing is not locked to a global timing source. In some such embodiments, a wireless communications device, which intends to use a new channel, monitors control signals from other channels already in use to determine their control slot timing characteristics, and determines control slot timing for the new channel as a function of control slot timing information corresponding to one or more other channels. In some such embodiments, the wireless communications device selects control slot timing for the new channel so as to minimize or prevent overlap between control time slots of the new channel and control time slots corresponding to channels already in use.

An exemplary method of operating a wireless terminal, in accordance with some embodiments, comprises: selecting one of a plurality of communications channels for use in communicating information, determining a position of a control time slot to be used on the selected one of the plurality of communications channels said determined position being offset from the positions of other control time slots used on other ones of said plurality of communications channels. The exemplary method further comprises performing at least one of transmitting and monitoring on said selected one of the plurality of communications channels during said control time slot.

An exemplary wireless terminal in accordance with some embodiments, comprises: at least one processor configured to: select one of a plurality of communications channels for use in communicating information; determine a position of a control time slot to be used on the selected one of the plurality of communications channels said determined position being offset from the positions of other control time slots used on other ones of said plurality of communications channels; and perform at least one of transmitting and monitoring on said selected one of the plurality of communications channels during said control time slot. The exemplary wireless terminal further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 19 is a drawing illustrating exemplary timing in an exemplary embodiment in which dedicated time is allocated to each of a plurality of bands for a control channel as a function of band ID and time.

FIG. 20 is a drawing illustrating exemplary timing in an exemplary embodiment in which 2 contiguous bands share common control channel times.

DETAILED DESCRIPTION

Figure 1:
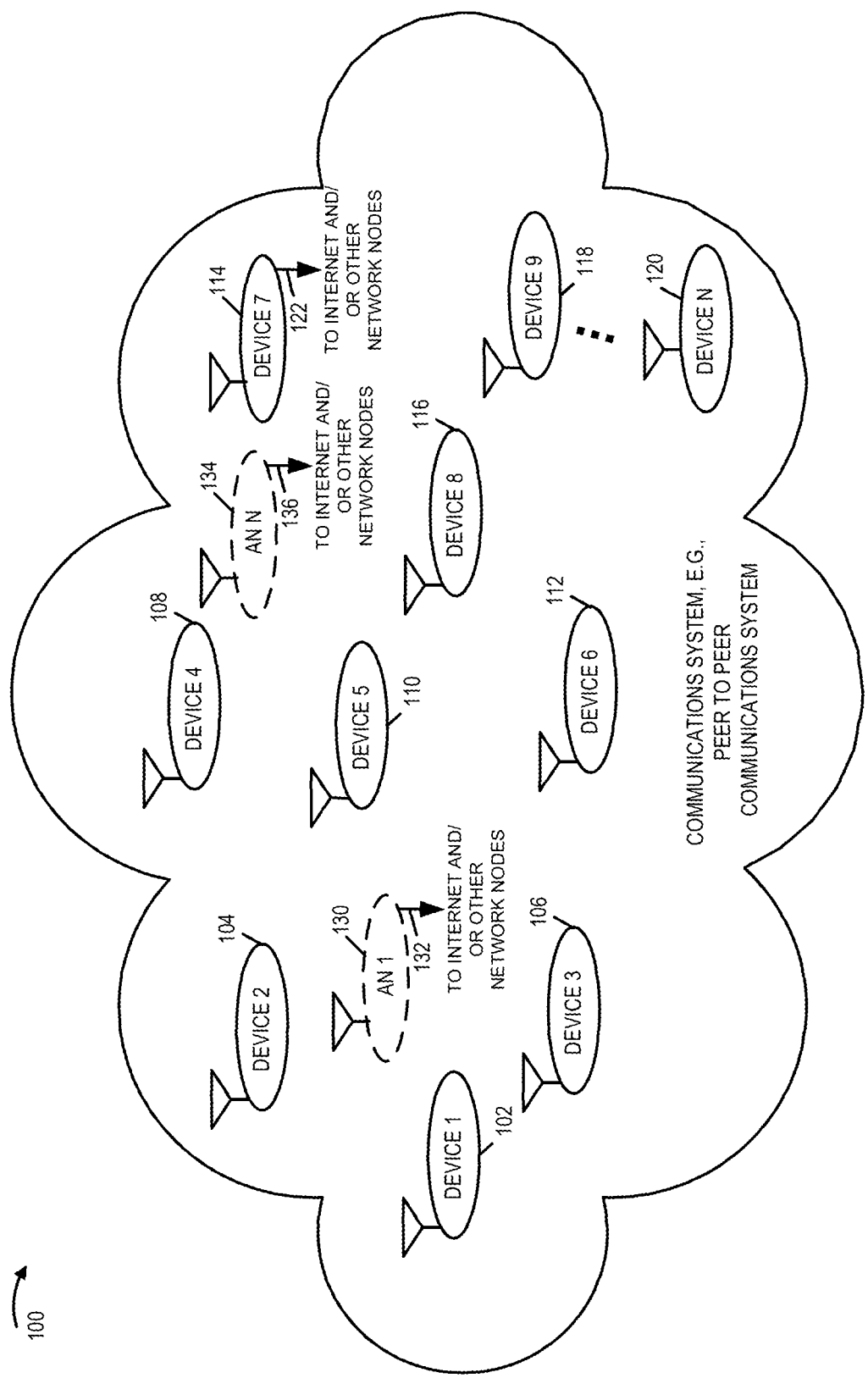
FIG. 1 is a drawing of an exemplary wireless communications system, e.g., a peer to peer wireless communications system, in accordance with an exemplary embodiment.

FIG. 1 is a drawing of an exemplary wireless communication system 100, e.g., a peer to peer communications system, in accordance with an exemplary embodiment. Exemplary wireless communications system 100 includes a plurality of wireless communications devices (device 1 102, device 2 104, device 3 106, device 4 108, device 5 110, device 6 112, device 7 114, device 8 116, device 9 118, . . . , device N 120). Some of the wireless communications devices in system 100, e.g., device 7 114, include an interface 122, to the Internet and/or other network nodes. Some of the wireless communications devices in system 100, e.g., device 1 102, device 2 104, device 3 106, device 4 108, device 5 110, device 6 112, device 8 116, device 9 118 and device N 120, are mobile wireless terminals, e.g., handheld mobile devices.

A wireless communications device, e.g., device 1 102, selects one of a plurality of communications channels for use in communicating information and determines a position of a control time slot to be used on the selected communications channel. The wireless communications device transmits and/or monitors on the selected communications channel during the determined control time slot. At different locations different communications channels, e.g., different unused TV channels, may be available for use for peer to peer communications. In some embodiments, for at least some wireless communications devices, the wireless communications device determines its location directly, e.g., via received GPS signals. In some embodiments, for at least some wireless terminals, an external device, e.g., an access point, determines the location of the wireless communications device.

In some embodiments, control time slots corresponding to available channels at a particular location are predetermined, e.g., in according with a recurring structure. In some such embodiments, the recurring structure is synchronized with respect to an external timing reference, e.g., a GPS signal or a timing signal from an access point. In some embodiments, for at least some wireless communications devices, the wireless communications device directly determines timing with respect to the external timing reference, e.g., synchronizing with respect to a received GPS signal or a received access point timing signal. In some embodiments, for at least some wireless terminals, timing information is indirectly propagated to the wireless communications device.

In some embodiments, control time slots corresponding to communications channels are not synchronized with respect to an external timing reference signal. In some such embodiments, a wireless communications device which intends to transmit control signals on an unused available communications channel, selects the timing for the control time slots and/or the periodicity as a function of control time slots on other channels already in use, e.g., selecting control time slots which are non-overlapping those already in use.

In some embodiments, the communication system 100 includes one or more access nodes, e.g., access node 1 130, . . . access node N 134. In some embodiments, the access nodes (access node 1 130, . . . , access node N 134) are coupled to the Internet and/or other network nodes via network links (132, . . . 136). In some embodiments, the access nodes are coupled via a backhaul network to a central node including information pertaining to available white space, e.g., unused TV channels available for local peer to peer network wireless communications usage at different locations. In some embodiments, an access node communicates one or more or all of: device location information, channel availability information corresponding to a location, control slot timing information corresponding to one or more channels, control slot hopping information, and recurring timing structure information to a wireless terminal.

Figure 2:
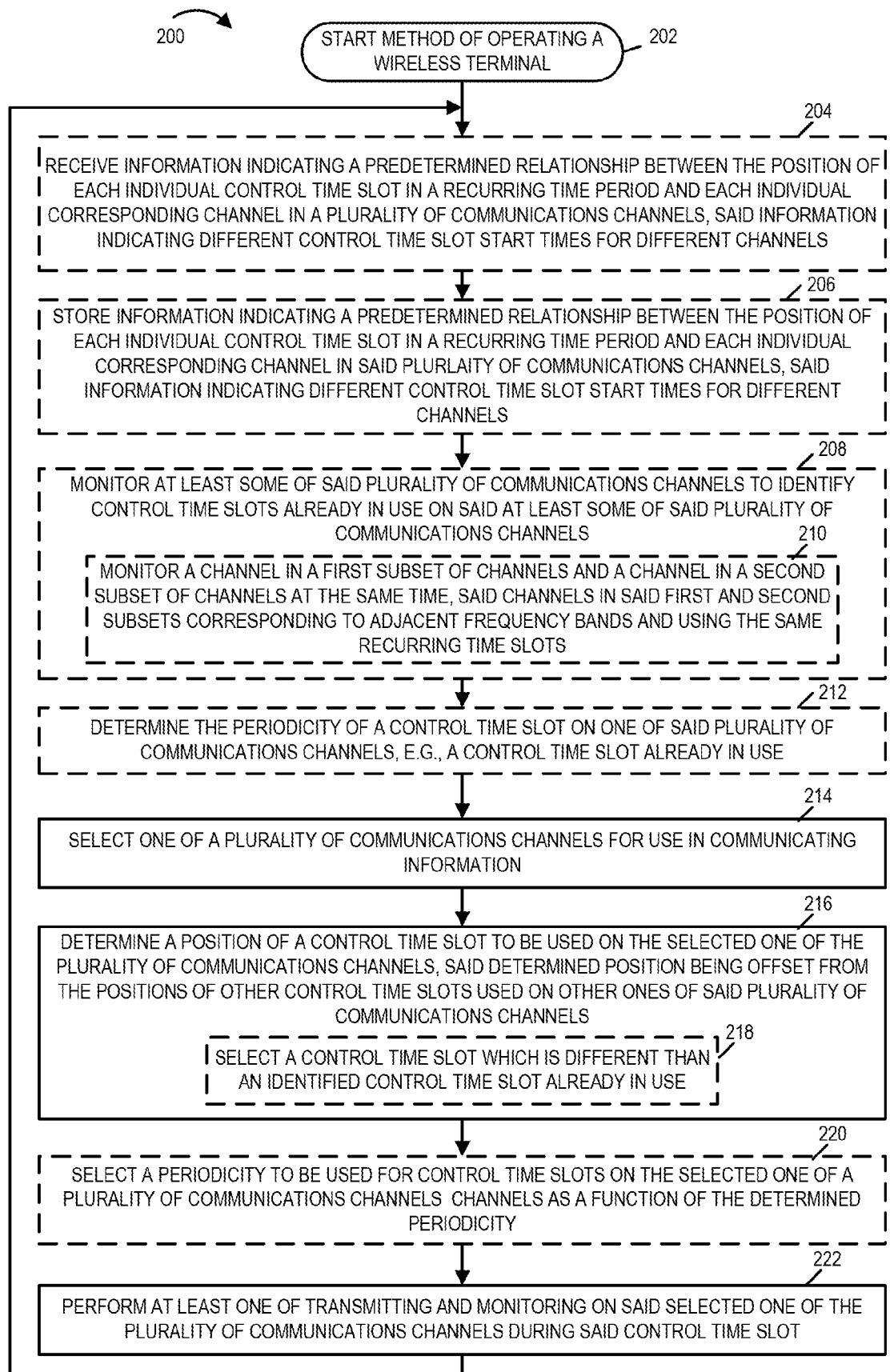
FIG. 2 is a flowchart illustrating exemplary methods of operating a wireless terminal in accordance with various exemplary embodiments.

FIG. 2 is a flowchart 200 illustrating exemplary methods of operating a wireless terminal in accordance with various embodiments. The wireless terminal is, e.g., one of the wireless communications devices of system 100 of FIG. 1. Steps 204, 206, 208, 210, 212, 218 and 220 are optional steps. One or more or all of optional steps 204, 206, 208, 210, 212, 218 and 220, may be included in an embodiment. One or more or all of optional steps 204, 206, 208, 210, 212, 218 and 220, may be omitted in an embodiment. When an optional step is not performed, it is bypassed in the flow of flowchart 200.

An exemplary method will now be described which includes steps 202, 204, 206, 208, 214, 216 and 222, and which may include one or more of step 210 and step 218.

Operation starts in step 202 where the wireless terminal is powered on and initialized. Operation proceeds from step 202 to step 204. In step 204 the wireless terminal receives information indicating a predetermined relationship between the position of each individual control time slot in a recurring time period and each individual corresponding channel in a plurality of communications channels, said information indicating different control time slot start times for different channels. In some embodiments, the wireless terminal receives the information indicating a predetermined relationship between the position of each individual control time slot in a recurring time period and each individual corresponding channel in a plurality of communications channels via a wireless communications link. Operation proceeds from step 204 to step 206.

In step 206, the wireless terminal stores information, e.g., a list, indicating a predetermined relationship between the position of each individual control time slot in a recurring time period and each individual corresponding channel in said plurality of communications channels, said information indicating different control channel time slot start times for different channels. In some embodiments, the starts times are different by at least 25% of the duration of the shortest time control time slot used on any one of said plurality of communications channels. In some embodiments, the control time slots of some of the different channels partially overlap. Operation proceeds from step 206 to step 208.

In step 208, the wireless terminal monitors at least some of said plurality of communications channels to identify control time slots already in use on said at least some of said plurality of communications channels. In some embodiments, step 208 includes step 210 in which the wireless terminal monitors a channel in a first subset of channels and a channel in a second subset of channels at the same time, said channels in said first and second subsets corresponding to adjacent frequency bands and using the same recurring time slots. Operation proceeds from step 208 to step 214.

In step 214, the wireless terminal selects one of a plurality of communications channels for use in communicating information. Operation proceeds from step 214 to step 216. In step 216 the wireless terminal determines a position of a control time slot to be used on the selected one of the plurality of communications channels, said determined position being offset from the position of other control time slots used on other ones of said plurality of communications channels. In some embodiments, during some times, step 216 includes step 218 in which the wireless terminal selects a control time slot which is different than an identified control time slot already in use. For example, at times the wireless terminal may have selected in step 214 to use an available communications channel which is not already in use, e.g., because the wireless terminal does not support the technologies being used on the communications channels already in use and/or because the communications channels already in use are heavily loaded. At other times, the wireless terminal may have selected in step 214 to use a communications channel already in use and step 218 is not performed. In some embodiments, in which step 218 is performed, the wireless terminal selects a control time slot which is different than any of the other identified control time slots already in use on other communications channels. In some embodiments, the control time slots of some of the different channels partially overlap. Operation proceeds from step 216 to step 222.

In step 222 the wireless terminal performs at least one of transmitting and monitoring on said selected one of the plurality of communications channels during said control time slot. Operation proceeds from step 222 to step 208.

In some embodiments, the control time slots hop within a predetermined recurring time period according to a predetermined pattern based on the communications channel to which the control time slot corresponds. In some embodiments, the communications channels are TV frequency bands. In some embodiments, the communications channels are FCC designated white space channels. In some embodiments, the communications channels are TV frequency bands which are unused at a location and are free, in accordance with FCC rules, to be used for communications, e.g., peer to peer local network wireless communications.

In various embodiments, the time between control time slots on one of said plurality of communications channels is different than the time between control time slots on a second one of said plurality of communications channels resulting in different control time slot periodicity on the first and the second one of said plurality of communications channels.

In some embodiments, the plurality of communications channels is a first sub-set of TV channels, and a second sub-set of TV channels includes at least one channel which uses the same control time slot in the first subset of TV channels. In some such embodiments monitoring at least some of the plurality of communications channels includes monitoring a channel in the first subset and a channel in the second subset at the same time, said channels in the first and second subsets corresponding to adjacent frequency bands and using the same control time slot. In some embodiments, said plurality of communications channels includes two adjacent channels using the same control time slot and monitoring at least some of the plurality of communications channels includes monitoring both of the two adjacent channels during the same control time slot.

An exemplary method will now be described which includes steps 202, 208, 212, 214, 216, 218, 220 and 222, and which may include step 210.

Operation starts in step 202 where the wireless terminal is powered on and initialized. Operation proceeds from step 202 to step 208.

In step 208 the wireless terminal monitors at least some of said plurality of communications channels to identify control time slots already in use on said at least some of said plurality of communications channels. In some embodiments, step 208 includes step 210 in which the wireless terminal monitors a channel in a first subset of channels and a channel in a second subset of channels at the same time, said channels in said first and second subsets corresponding to adjacent frequency bands and using the same recurring time slots. Operation proceeds from step 208 to step 212.

In step 212 the wireless terminal determines the periodicity of a control time slot on one of said plurality of communications channels, e.g., a control time slot already in use. Operation proceeds from step 212 to step 214.

In step 214, the wireless terminal selects one of a plurality of communications channels for use in communicating information. Operation proceeds from step 214 to step 216. In step 216 the wireless terminal determines a position of a control time slot to be used on the selected one of the plurality of communications channels, said determined position being offset from the position of other control time slots used on other ones of said plurality of communications channels. Step 216 includes step 218 in which the wireless terminal selects a control time slot which is different than an identified control time slot already in use. In some embodiments, in step 218 the wireless terminal selects a control time slot which is different than any of the other identified control time slots already in use on other communications channels. In some embodiments, the control time slots of some of the different channels partially overlap. Operation proceeds from step 216 to step 220.

In step 220 the wireless terminal selects a periodicity to be used for control time slots on the selected one of a plurality of communications channels as a function of the determined periodicity of step 212. The selected periodicity may be the same or different than the determined periodicity. Operation proceeds from step 220 to step 222.

In step 222 the wireless terminal performs at least one of transmitting and monitoring on said selected one of the plurality of communications channels during said control time slot. Operation proceeds from step 222 to step 204.

In some embodiments, the communications channels are TV frequency bands. In some embodiments, the communications channels are FCC designated white space channels. In some embodiments, the communications channels are TV frequency bands which are unused at a location and are free, in accordance with FCC rules, to be used for communications, e.g., peer to peer local network wireless communications.

In various embodiments, the time between control time slots on one of said plurality of communications channels is different than the time between control time slots on a second one of said plurality of communications channels resulting in different control time slot periodicity on the first and the second one of said plurality of communications channels.

In some embodiments, the plurality of communications channels is a first sub-set of TV channels, and a second sub-set of TV channels includes at least one channel which uses the same control time slot in the first subset of TV channels. In some such embodiments monitoring at least some of the plurality of communications channels includes monitoring a channel in the first subset and a channel in the second subset at the same time, said channels in the first and second subsets corresponding to adjacent frequency bands and using the same control time slot. In some embodiments, said plurality of communications channels includes two adjacent channels using the same control time slot and monitoring at least some of the plurality of communications channels includes monitoring both of the two adjacent channels during the same control time slot.

Embodiments are also possible in which a wireless terminal performs each of the steps 202, 204, 206, 208, 210, 212, 214, 216, 218, 220, 222 of flowchart 200 of FIG. 2. For example, in one exemplary embodiment, at a first location the wireless terminal uses a predetermined recurring timing structure for local peer to peer networks synchronized with respect to an external timing source such as GPS timing and implements steps 202, 204, 206, 208, 214, 216 and 222, and may also implement one or more of steps 210 and 218. Continuing with the example, subsequently the wireless terminal may move to a second location where a predetermined fixed recurring timing structure is not used for local peer to peer networks and the wireless terminal implements steps 208, 212, 214, 216, 218, 220 and 222 and may also implement step 210.

Figure 3:
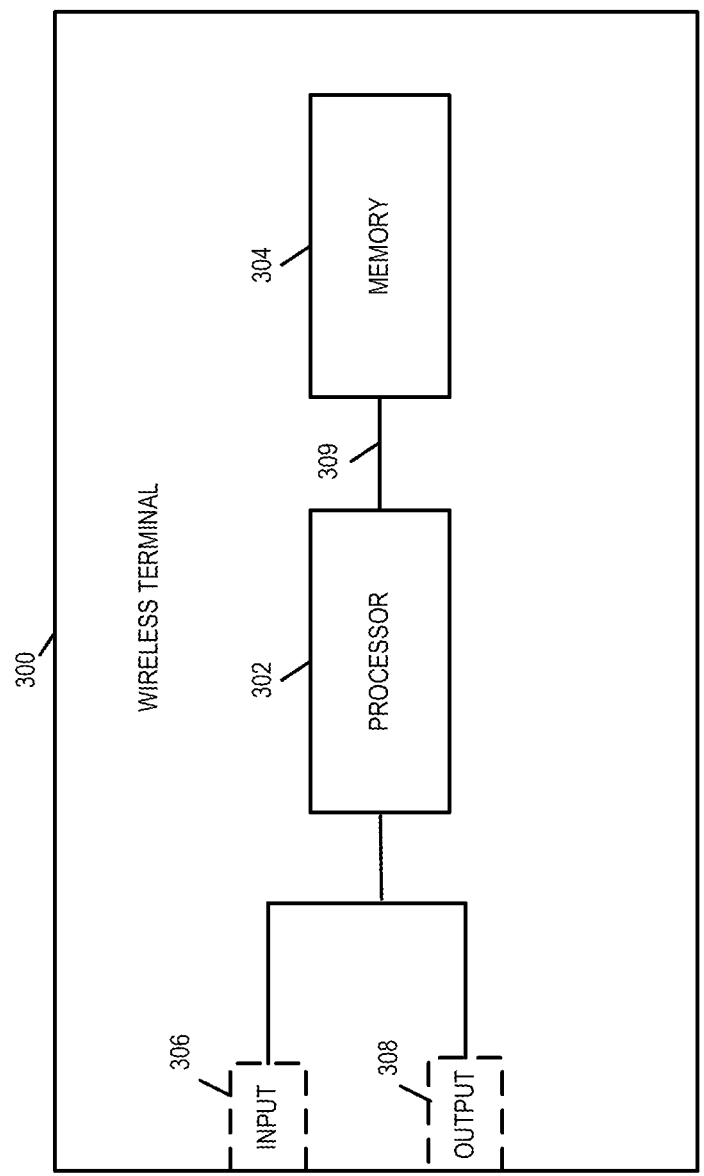
FIG. 3 is an exemplary wireless terminal in accordance with an exemplary embodiment.

FIG. 3 is a drawing of an exemplary wireless terminal in accordance with an exemplary embodiment. Exemplary wireless terminal 300 is, e.g., one of the wireless communications devices of FIG. 1. Exemplary wireless terminal 300 may, and sometimes does, implement a method in accordance with flowchart 200 of FIG. 2.

Wireless terminal 300 includes a processor 302 and memory 304 coupled together via a bus 309 over which the various elements (302, 304) may interchange data and information. Wireless terminal 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: select one of a plurality of communications channels for use in communicating information; determine a position of a control time slot to be used on the selected one of the plurality of communications channels said determined position being offset from the positions of other control time slots used on other ones of said plurality of communications channels; and perform at least one of transmitting and monitoring on said selected one of the plurality of communications channels during said control time slot. In some embodiments, processor 302 is further configured to: store information indicating a predetermined relationship between the position of each individual control time slot in a predetermined recurring time period and each individual corresponding channel in said plurality of communications channels, said information indicating different control time slot start times for different channels. In some such embodiments, prior to storing, the information which is stored or information used in deriving the information which is stored is received, e.g., via a wireless communications link.

In some embodiments, the start times are different by at least 25% of the duration of the shortest time control time slot used on any one of said plurality of communications channels. In various embodiments, the control time slots of some of the different channels partially overlap. In some embodiments, the control time slots hop within a predetermined recurring time period according to a predetermined pattern based on the communications channel to which the control time slots correspond.

In some embodiments, the communications channels are TV frequency bands. In some embodiments, the communications channels are FCC designated white space channels.

Processor 302, in some embodiments, is further configured to: monitor at least some of said plurality of communications channels to identify control time slots already in use on said at least some of said plurality of communications channels; and select a control time slot which is different than an identified control time slot already in use, as part of being configured to determine a position of a control time slot to be used on the selected one of the plurality of communications channels. In some such embodiments, processor 302 is configured to select a control time slot which is different from any of the identified control time slots already in use on other communications channels.

In some embodiments, the control time slots of some of the different channels partially overlap. In various embodiments, the time between control time slots on one of said plurality of communications channels is different than the time between control time slots on a second one of said plurality of communications channels resulting in a different control time slot periodicity on the first and second ones of said plurality of communications channels.

Processor 302, in some embodiments, is further configured to: determine the periodicity of control time slots on one of said plurality of communications channels; and select a periodicity to be used for control time slots on the selected communications channel as a function of the determined periodicity. The selected periodicity to be used on the selected communications channel may be the same periodicity or a different periodicity, than the determined periodicity.

In some embodiments, said plurality of communications channels is a first sub-set of TV channels, and wherein a second subset of TV channels includes at least one channel which uses the same control time slot as a channel in the first subset of TV channels. Thus, in some embodiments, multiple communications channels use the same control time slot.

In some embodiments, said plurality of communications channels is a first sub-set of TV channels, a second subset of TV channels includes at least one channel which uses the same control time slot as a channel in the first subset of TV channels, and processor 302 is further configured to monitor a channel in the first subset and a channel in the second subset at the same time, said channels in the first and second subsets corresponding to adjacent frequency bands, using the same control time slot, as part of being configured to monitor at least some of the plurality of communications channels. In some embodiments, said plurality of communications channels includes two adjacent TV channels using the same control time slot, and processor 302 is further configured to monitor the two adjacent channels at the same time.

Figure 4:
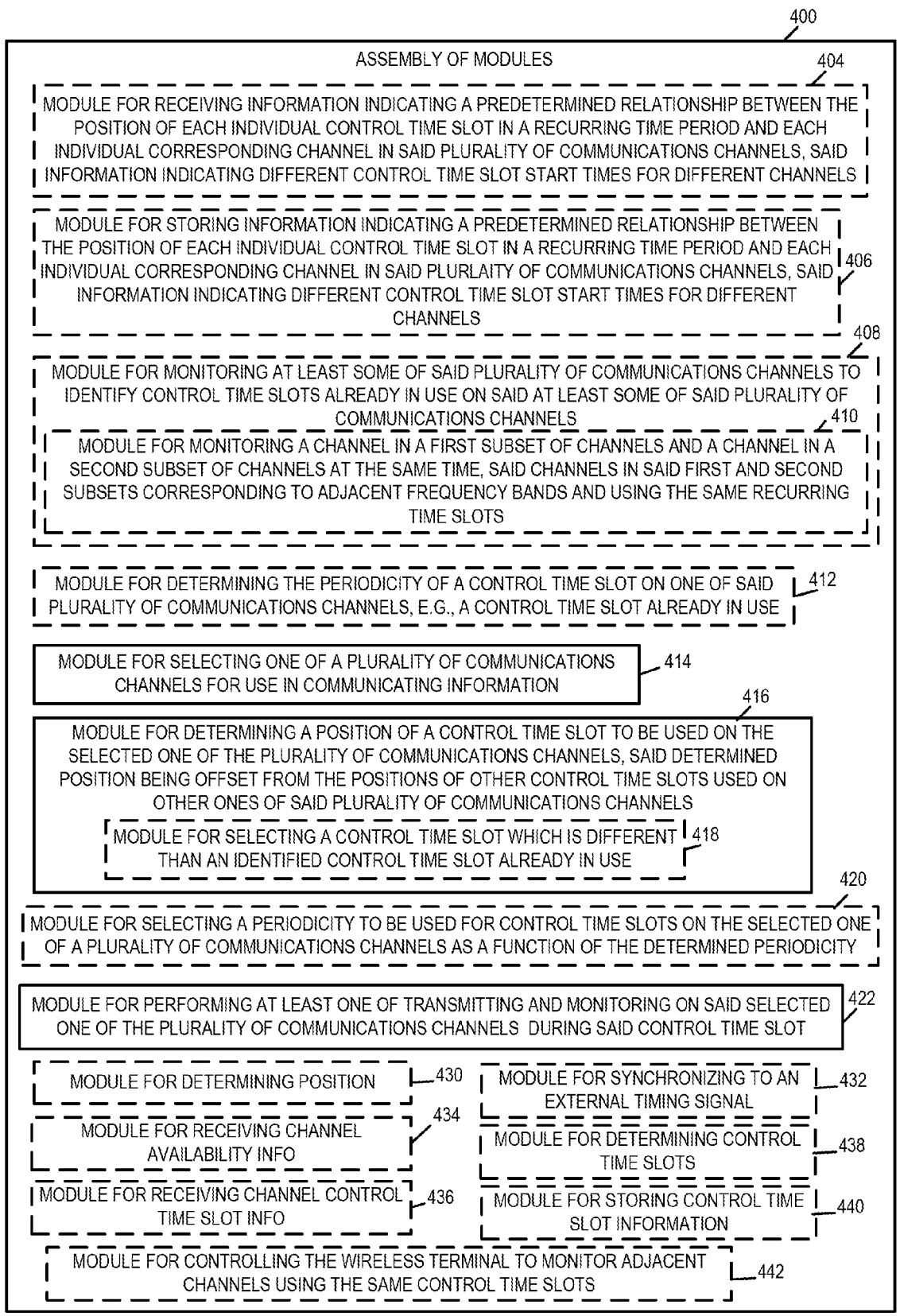
FIG. 4 is an assembly of modules which may be used in the exemplary wireless terminal of FIG. 3.

FIG. 4 is an assembly of modules 400 which can, and in some embodiments is, used in the wireless terminal 300 illustrated in FIG. 3. The modules in the assembly 400 can be implemented in hardware within the processor 302 of FIG. 3, e.g., as individual circuits. Alternatively, the modules may be implemented in software and stored in the memory 304 of the wireless terminal device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless terminal 300 or elements therein such as the processor 302, to perform the functions of the corresponding steps illustrated and/or described in the method of flowchart 200 of FIG. 2.

Assembly of modules 400 includes a module 414 for selecting one of a plurality of communications channels for use in communicating information, a module 416 for determining a position of a time slot to be used on the selected one of the plurality of communications channels, said determined position being offset from the positions of other control slots used on other ones of said plurality of communications channels, and a module 422 for performing at least one of transmitting and monitoring on said selected one of the plurality of communications channels during said control time slot.

In various embodiments, assembly of modules 400 further includes one or more or all of: a module 404 for receiving information indicating a predetermined relationship between the position of each individual control time slot in a recurring time period and each individual corresponding channel in said plurality of communications channels, said information indicating different control time slots for different channels, a module 406 for storing information indicating a predetermined relationship between the position of each individual control time slot in a recurring time period and each individual corresponding channel in said plurality of communications channels, said information indicating different control time slots for different channels, a module 408 for monitoring at least some of said plurality of communications channels to identify control time slots already in use on said at least some of said plurality of communications channels, a module 412 for determining the periodicity of a control time slot on one of said plurality of communications channels, e.g., a control time slot already in use, and a module 420 for selecting a periodicity to be used for control time slots on the selected one of a plurality of communications channels as a function of the determined periodicity from module 412. In some embodiments, module 404 receives information indicating a predetermined relationship between the position of each individual control time slot in a recurring time period and each individual corresponding channel in said plurality of communications channels via a wireless link.

In some embodiments, module 408 for monitoring at least some of said plurality of communications channels includes a module 410 for monitoring a channel in a first subset of channels and a channel in a second subset of channels at the same time, said channels in said first and second subsets corresponding to adjacent frequency bands and using the same recurring time slots.

In some embodiment module 416 for determining a position of a control time slot to be used on the selected one of the plurality of communications channels includes a module 418 for selecting a control time slot which is different than an identified control time slot already in use. In some such embodiments, module 418 selects a control time slot which is different than any of the identified control time slots already in use on other communications channels.

In various embodiments, assembly of module 400 includes one or more of all of: a module 430 for determining wireless terminal position, e.g., a GPS module, a module 432 for synchronizing to an external timing signal, e.g. a module for synchronizing to a timing reference, e.g., global timing reference, via a received GPS signal or base station timing signal, a module 434 for receiving channel availability information, e.g., a list of available white space channels, a module 436 for receiving channel control time slot information 436, a module for determining control time slots 438, a module 440 for storing control time slot information, and a module 442 for controlling the wireless terminal to monitor adjacent channels using the same control time slots. In some embodiments, module 438 determines, for one or more available channels, a control time slot corresponding to a channel as a function of: a channel ID received by module 434 and time based on synchronization by module 432. In some embodiments, module 436 receives updates to the control time slot structure from an access point. In some embodiments, at least some adjacent channels use the same control time slots, and module 442 controls the wireless terminal to operate in a wide band reception mode, at times, to recover control signals from the two adjacent channels using the same control time slot.

Figure 5:
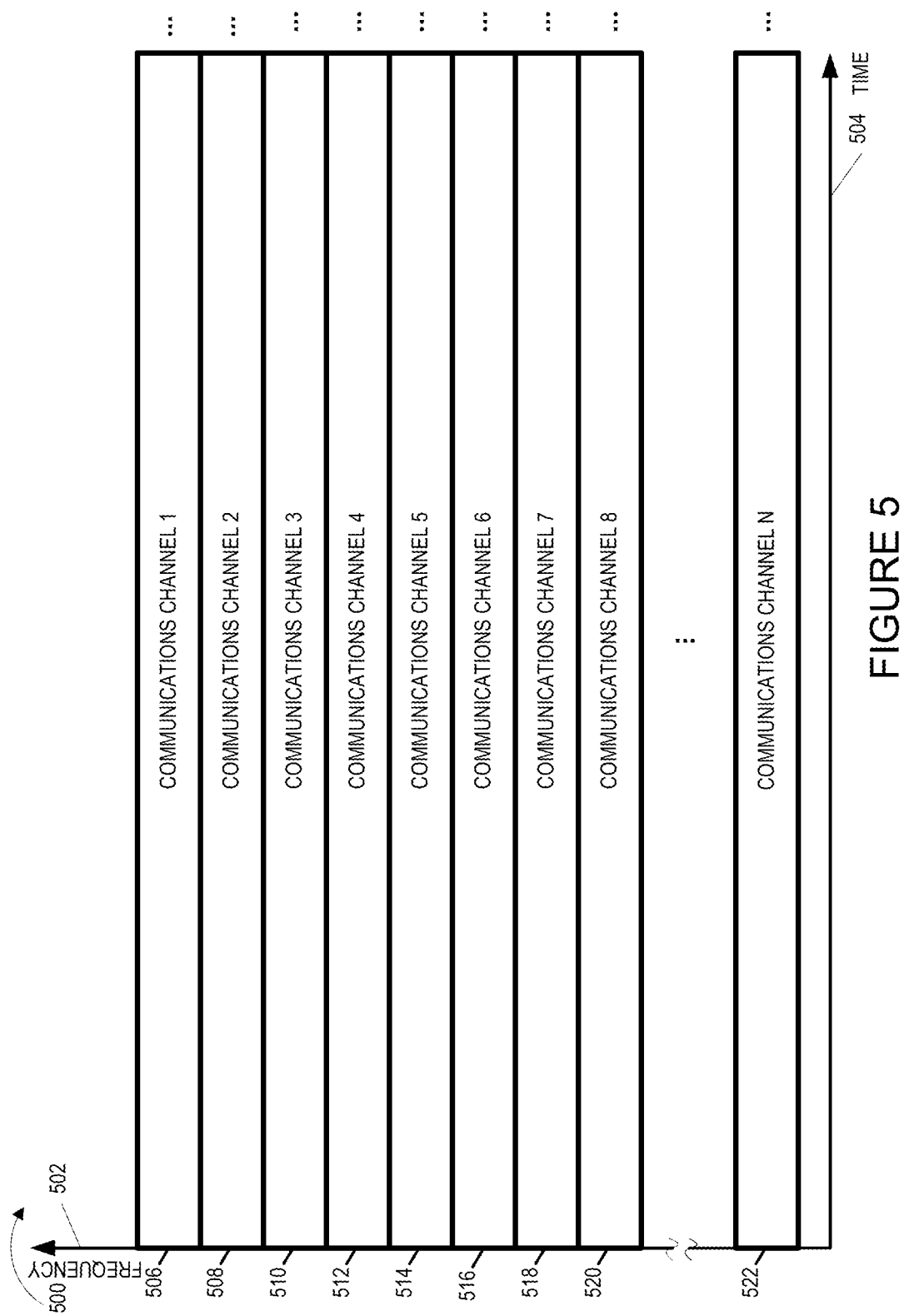
FIG. 5 is a drawing illustrating exemplary communications channels that may be used for wireless communications in accordance with various exemplary embodiments.

FIG. 5 is a drawing 500 illustrating exemplary communications channels, e.g., unused TV channels at a particular location, that may be used for wireless communications in accordance with FCC rules and regulations, e.g., for local peer to peer network communications, in accordance with various exemplary embodiments. Vertical axis 502 represents frequency while horizontal axis 504 represents time. In this example, there are N communications channels (communications channel 1 506, communications channel 2 508, communications channel 3 510, communications channel 4 512, communications channel 5 514, communications channel 6 516, communications channel 7 518, communications channel 8 520, . . . , communications channel N 522).

Figure 6:
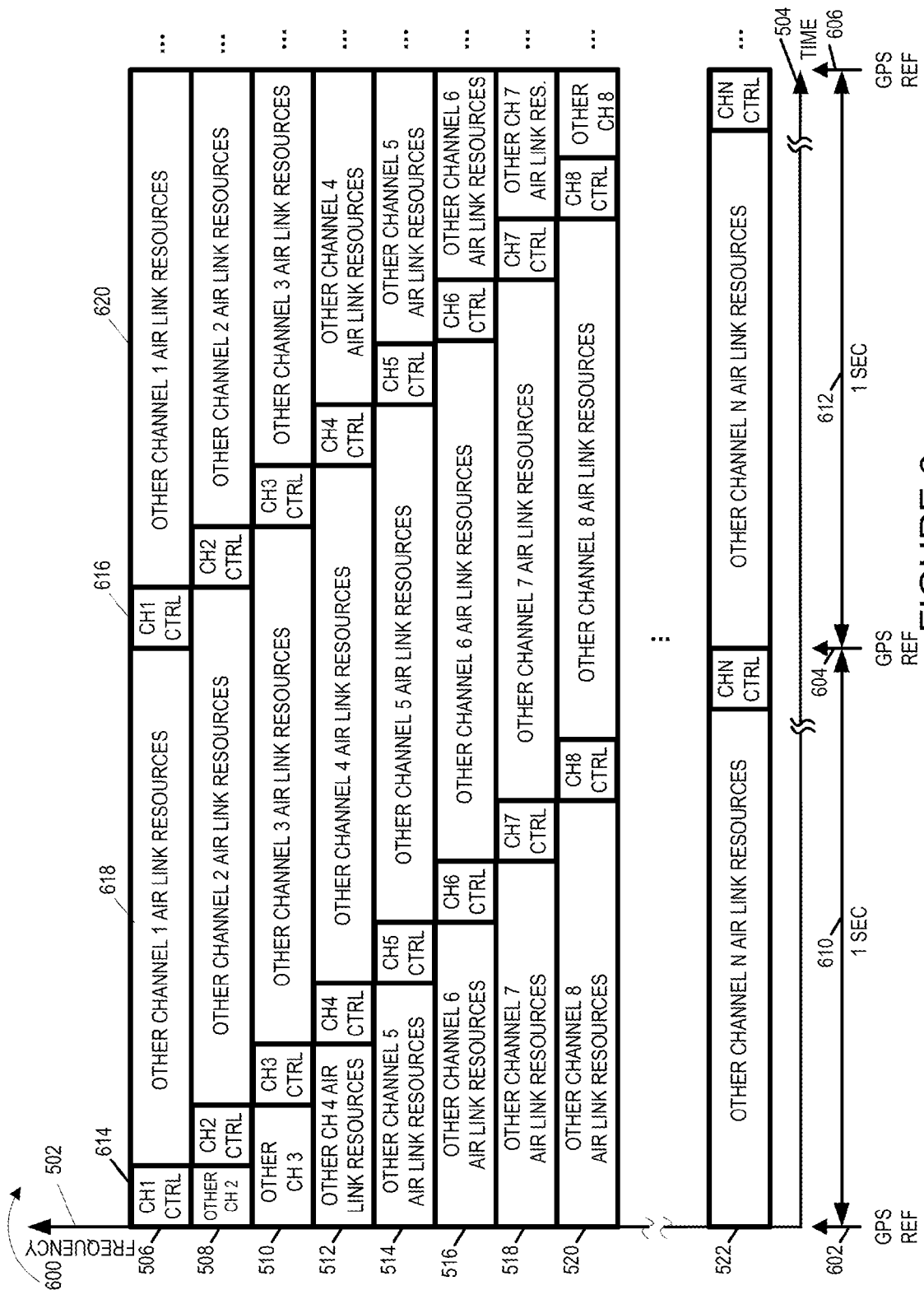
FIG. 6 is a drawing illustrating exemplary control time slot air link resources corresponding to each of the communications channels of FIG. 5 in accordance with an exemplary embodiment.

FIG. 6 is a drawing 600 illustrating exemplary air link resources including control time slot air link resources corresponding to each of the communications channels of FIG. 5 in accordance with an exemplary embodiment. In this example, there are predetermined control time slots corresponding to each of the communications channels in accordance with a predetermined recurring timing structure. In this example, control time slots corresponding to different channels are non-overlapping.

Each communications channel includes predetermined control channel air link resources occurring during predetermined control channel time slots within the recurring timing structure. For example, communications channel 1 506 includes channel 1 control air link resource 614 and channel 1 control air link resource 616, which are used to carry control signaling including, e.g., peer to peer discovery signals during channel 1 control time slots. At other times, the communications channel may be, and sometimes is, used for other purposes, e.g., including peer to peer traffic signaling. Other channel 1 air link resources 618, 620 carry signals including peer to peer traffic signals.

In this example, the control time slots and the recurring timing structure is synchronized with respect to a GPS reference signal which occurs at one second intervals as indicated by successive GPS signals (602, 604, 606) separated by 1 second intervals (610 and 612), respectively. In some embodiments, the time of a control time slot is predetermined and fixed for each of the communications channels, e.g., 10 milli-sec. For example, the time duration for each control air link resource, e.g., channel 1 control air link resource 614, is, e.g., 10 milli-sec. In some embodiments, the time of a control time slot is fixed for a particular channel, but is different corresponding to at least some channels. In some embodiments, the same channel may have multiple control time slots in the recurring timing structure and some of the multiple control time slots may have different durations.

Figure 7:
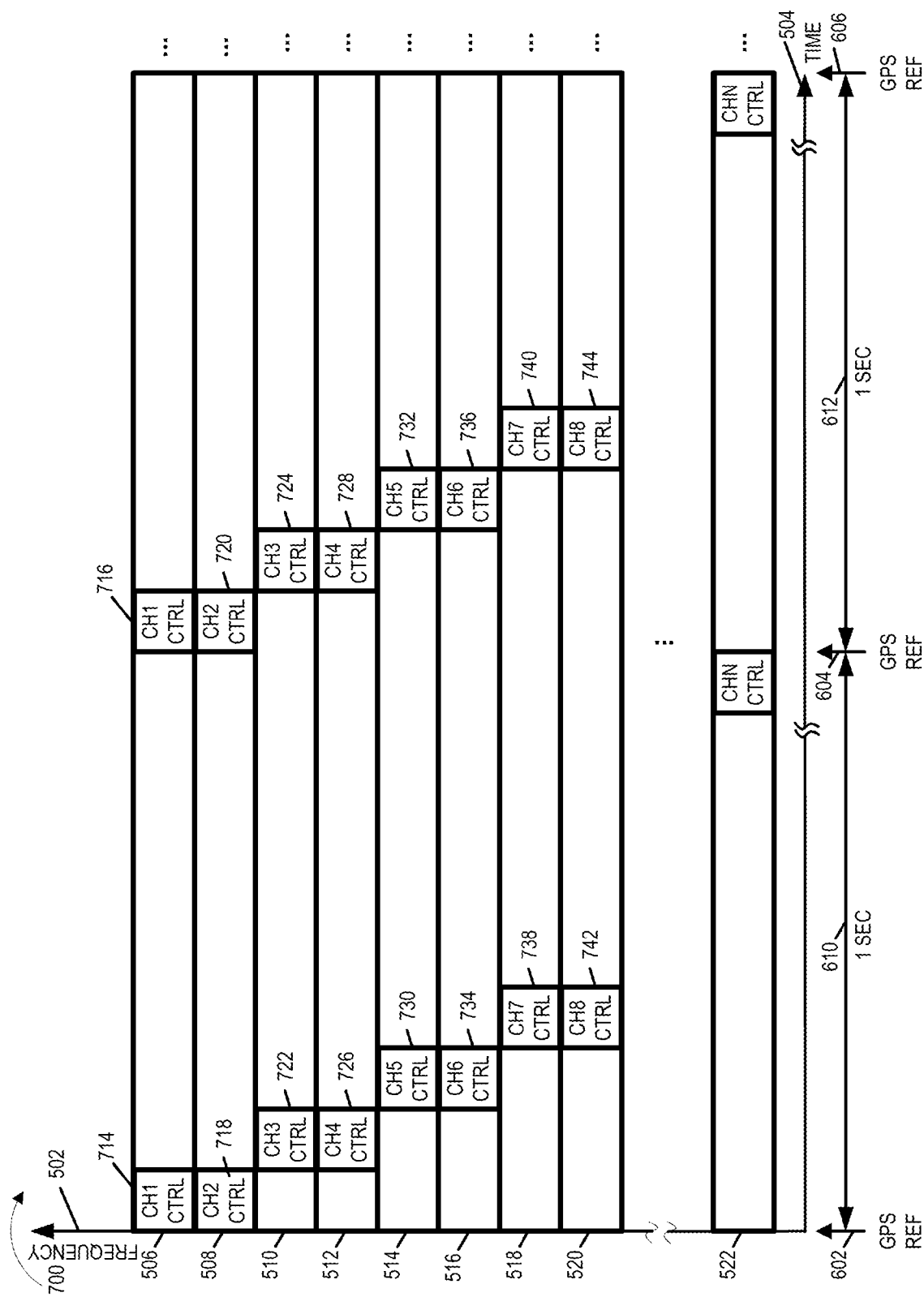
FIG. 7 is a drawing illustrating exemplary control time slot air link resources corresponding to each of the communications channels of FIG. 5 in accordance with another exemplary embodiment.

FIG. 7 is a drawing 700 illustrating exemplary control time slot air link resources corresponding to each of the communications channels of FIG. 5 in accordance with another exemplary embodiment. In this example, there are predetermined control time slots corresponding to each of the communications channels in accordance with a predetermined recurring timing structure. In this example, control time slots corresponding to some channels are overlapping. Control time slots corresponding to pairs of channels, adjacent in the frequency domain, are fully overlapping, in this example. This particular embodiment, facilites the monitoring of control information from multiple communications channels concurrently, e.g., by a wireless communications device which can set a single receiver to a wideband configuration to capture control signals from two adjacent channels.

The control time slots for communications channel 1 and communications channel 2 are fully overlapping. Channel 1 control air link resource 714 is timing aligned with channel 2 control air link resource 718. Similarly, channel 1 control air link resource 1 716 is timing aligned with channel 2 control air link resource 720.

The control time slots for communications channel 3 and communications channel 4 are fully overlapping. Channel 3 control air link resource 722 is timing aligned with channel 4 control air link resource 726. Similarly, channel 3 control air link resource 724 is timing aligned with channel 4 control air link resource 728.

The control time slots for communications channel 5 and communications channel 6 are fully overlapping. Channel 5 control air link resource 730 is timing aligned with channel 6 control air link resource 734. Similarly, channel 5 control air link resource 732 is timing aligned with channel 6 control air link resource 736.

The control time slots for communications channel 7 and communications channel 8 are fully overlapping. Channel 7 control air link resource 738 is timing aligned with channel 8 control air link resource 742. Similarly, channel 7 control air link resource 740 is timing aligned with channel 8 control air link resource 744.

Figure 8:
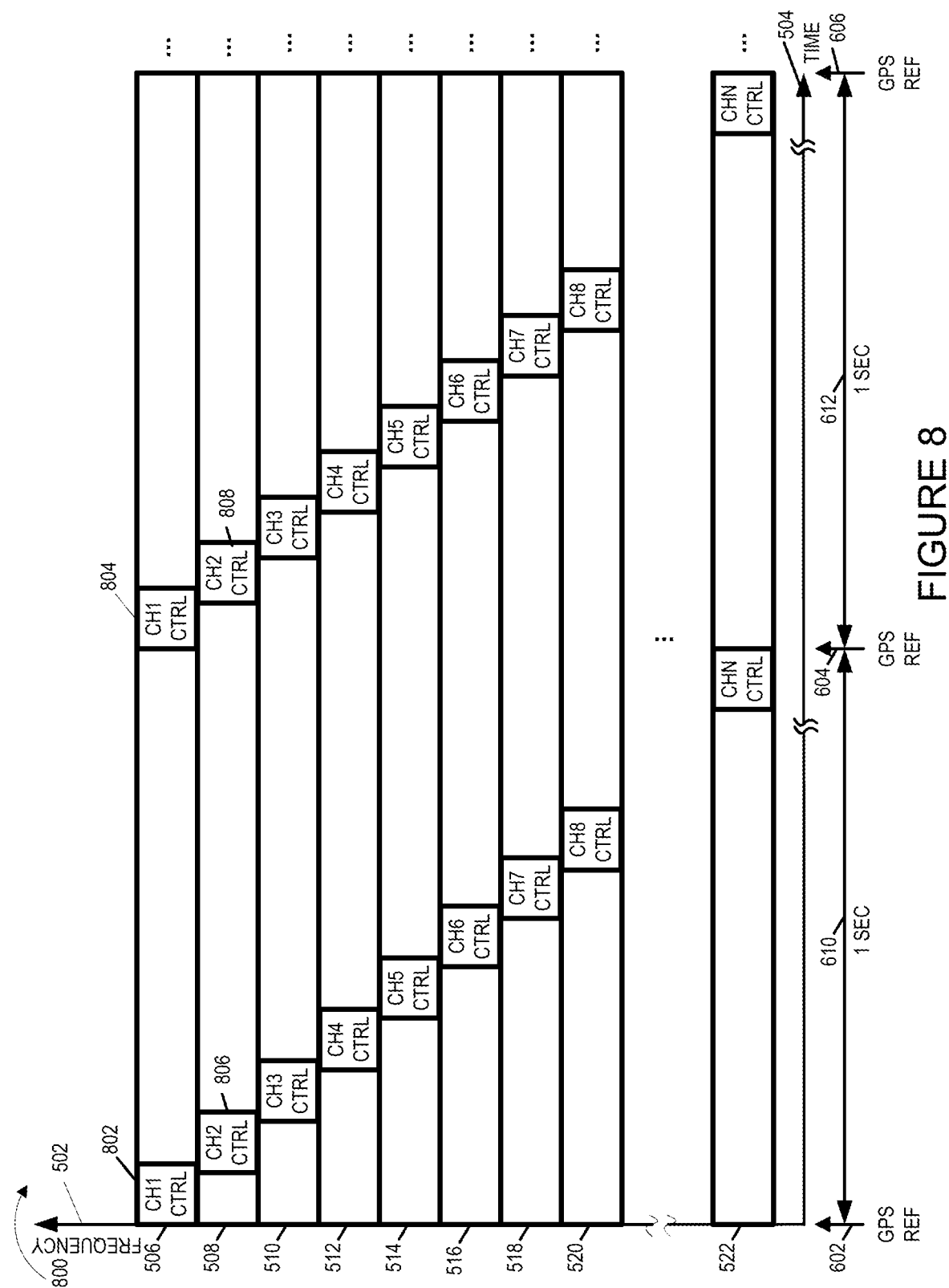
FIG. 8 is a drawing illustrating exemplary control time slot air link resources corresponding to each of the communications channels of FIG. 5 in accordance with yet another exemplary embodiment.

FIG. 8 is a drawing 800 illustrating exemplary control time slot air link resources corresponding to each of the communications channels of FIG. 5 in accordance with yet another exemplary embodiment. In this example, there are predetermined control time slots corresponding to each of the communications channels in accordance with a predetermined recurring timing structure. In this example, control time slots corresponding to some channels are partially overlapping. In some embodiments, a control time slot corresponding to a channel overlaps by at most 25% with another control time slot which corresponds to a different channel.

In this example, a communications channel 1 control time slot partially overlaps with a communications channel 2 control time slot. Channel 1 control air link resource 802 partially overlaps in time with channel 2 control air link resource 806. Similarly, channel 1 control air link resource 804 partially overlaps in time with channel 2 control channel air link resource 808. Partial overlap between other communications channels control slots is illustrated in FIG. 8

Figure 9:
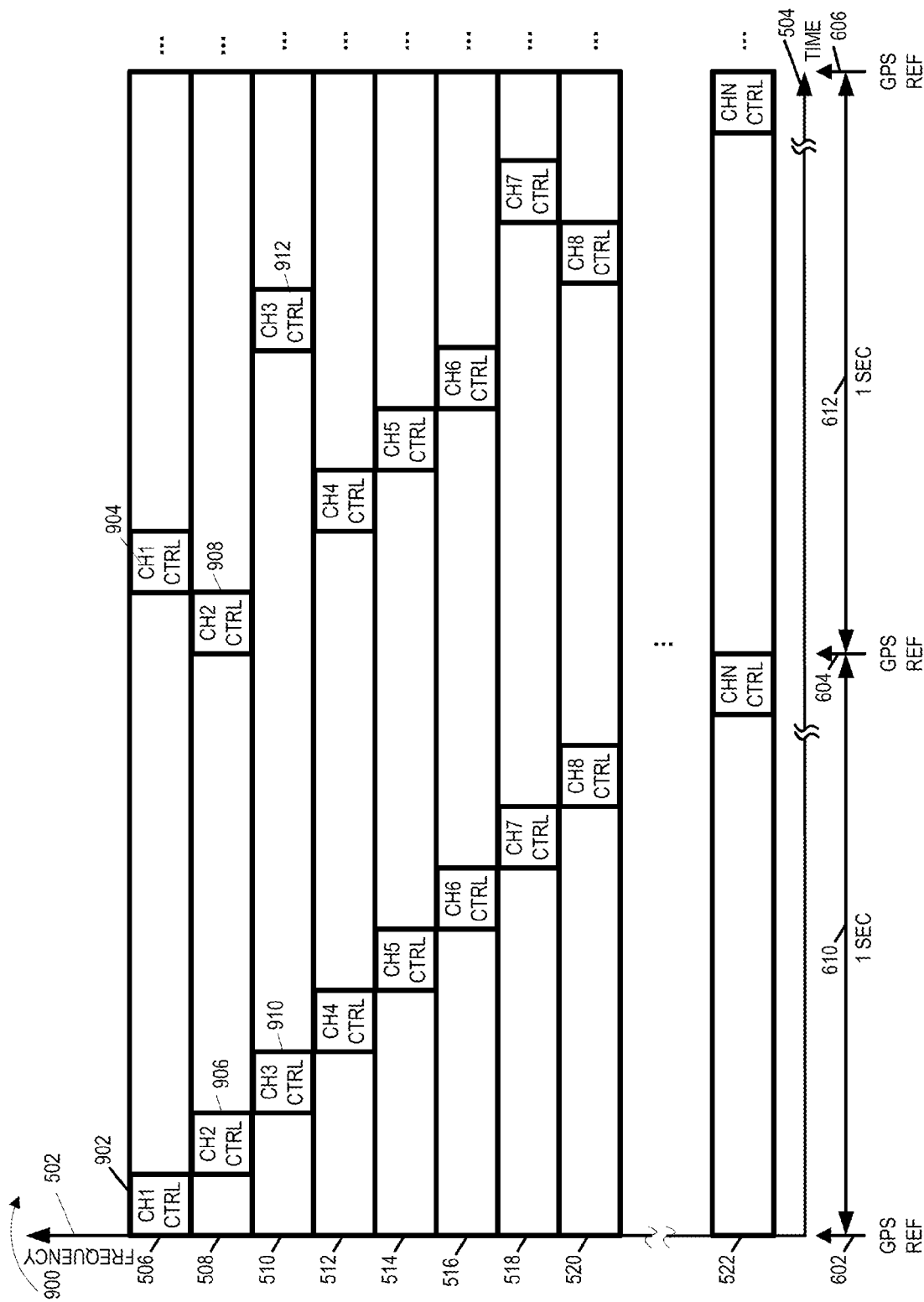
FIG. 9 is a drawing illustrating exemplary control time slot air link resources corresponding to each of the communications channels of FIG. 5 in accordance with yet another exemplary embodiment.

FIG. 9 is a drawing 900 illustrating exemplary control time slot air link resources corresponding to each of the communications channels of FIG. 5 in accordance with yet another exemplary embodiment. In this example, there are predetermined control time slots corresponding to each of the communications channels in accordance with a predetermined recurring timing structure. In this example, control time slots corresponding to channels are hopped in accordance with a predetermined hopping pattern.

For example, the channel 1 control time slot occurs in the first slot of the structure as indicated by the location of channel 1 control air link resource 902 in the first second 610, while the channel 1 control time slot occurs in the second slot of the structure as indicated by the location of channel 1 control air link resource 904 in the second 612. Continuing with the example, the channel 2 control time slot occurs in the second slot of the structure as indicated by the location of channel 2 control air link resource 906 in the first second 610, while the channel 2 control time slot occurs in the first slot of the structure as indicated by the location of channel 2 control air link resource 908 in the second 612. Continuing with the example, the channel 3 control time slot occurs in the third slot of the structure as indicated by the location of channel 3 control air link resource 910 in the first second 610, while the channel 3 control time slot occurs in the sixth slot of the structure as indicated by the location of channel 3 control air link resource 912 in the second 612. The control time slots corresponding to other channels are hopped as shown in FIG. 9

Figure 10:
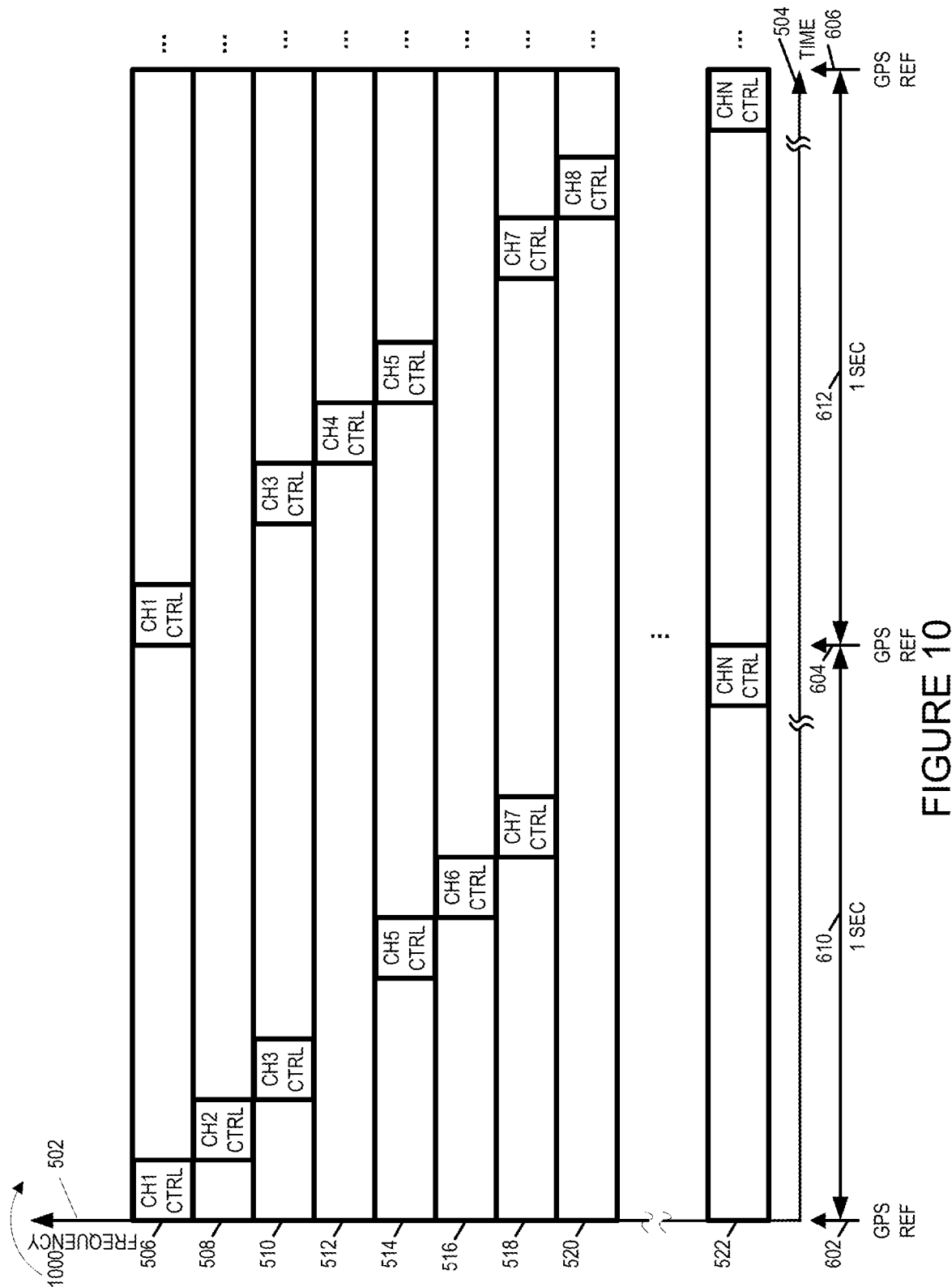
FIG. 10 is a drawing illustrating exemplary control time slot air link resources corresponding to each of the communications channels of FIG. 5 in accordance with yet another exemplary embodiment.

FIG. 10 is a drawing 1000 illustrating exemplary control time slot air link resources corresponding to each of the communications channels of FIG. 5 in accordance with yet another exemplary embodiment. In this example, there are predetermined control time slots corresponding to each of the communications channels in accordance with a predetermined recurring timing structure. In this example, control time slots corresponding to some channels have different periodicity.

In this example, the control time slots corresponding to channels 1, 3, 5, 7, and N occur once per second, while the control time slots corresponding to channels 2, 4, 6, and 8 occurs once every 2 seconds.

Figure 11:
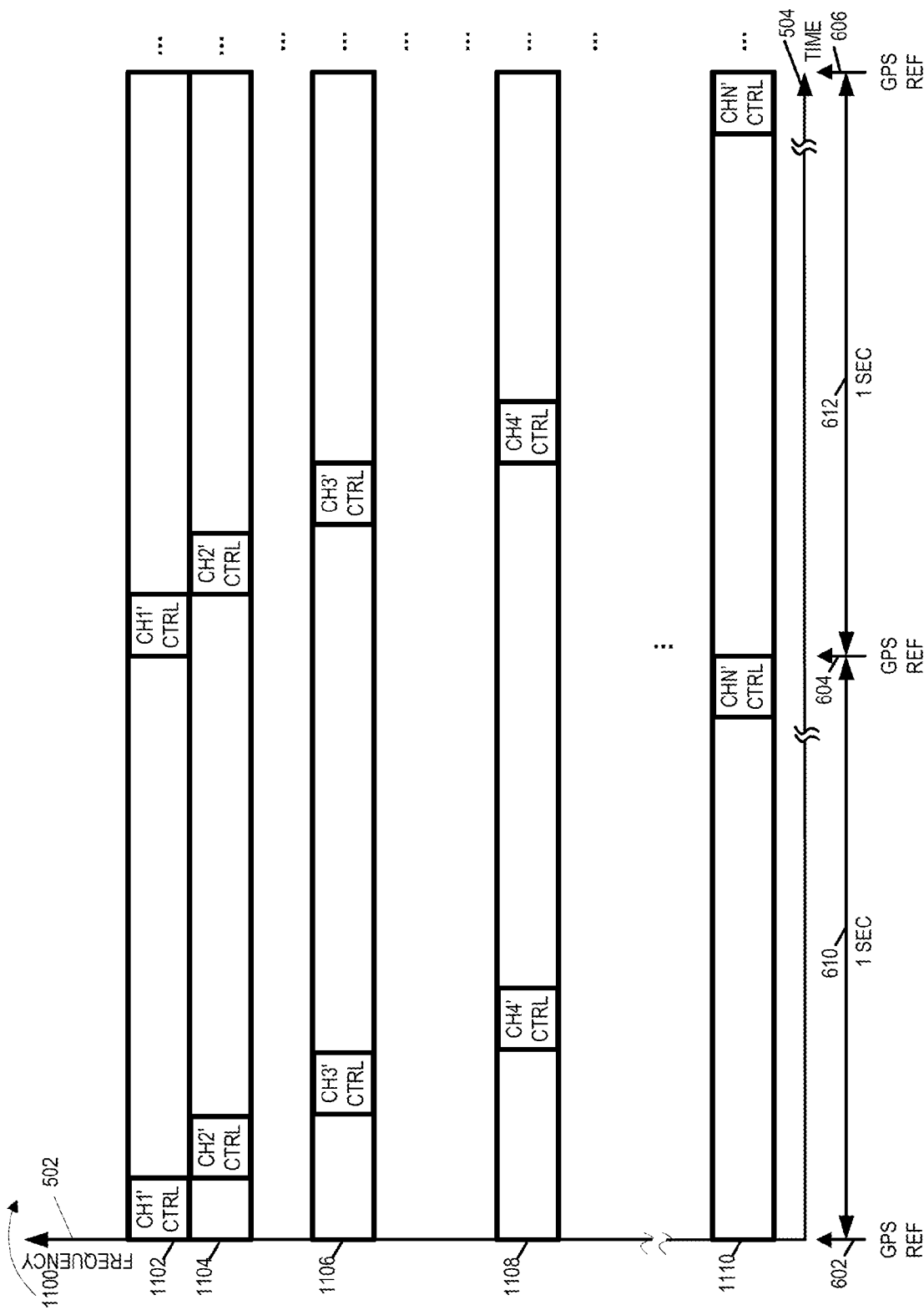
FIG. 11 is a drawing illustrating exemplary control time slot air link resources corresponding to some of the communications channels of FIG. 5 in accordance with another exemplary embodiment.

FIG. 11 is a drawing 1100 illustrating exemplary control time slot air link resources corresponding to some of the communications channels of FIG. 5 in accordance with another exemplary embodiment. In this example, there are predetermined control time slots corresponding to communications channels (channel 1' 1102, channel 2' 1104, channel 3' 1106 channel 4' 1108, and channel N' 1110) in accordance with a predetermined recurring timing structure. In this example, communications channel 1' 1102 is adjacent to communications channel 2' 1104. However, communications channel 3' 1106 is not adjacent to communications channel 2' 1104 or communications channel 4' 1108. Communications channels (1102, 1104, 1106, 1108, 1110) are, in this example, available for peer to peer communications at a particular location of interest. However the other communications channels are not available for peer to peer communications at the particular location of interest, e.g., because those channels are being used for TV broadcasting.

Figure 12:
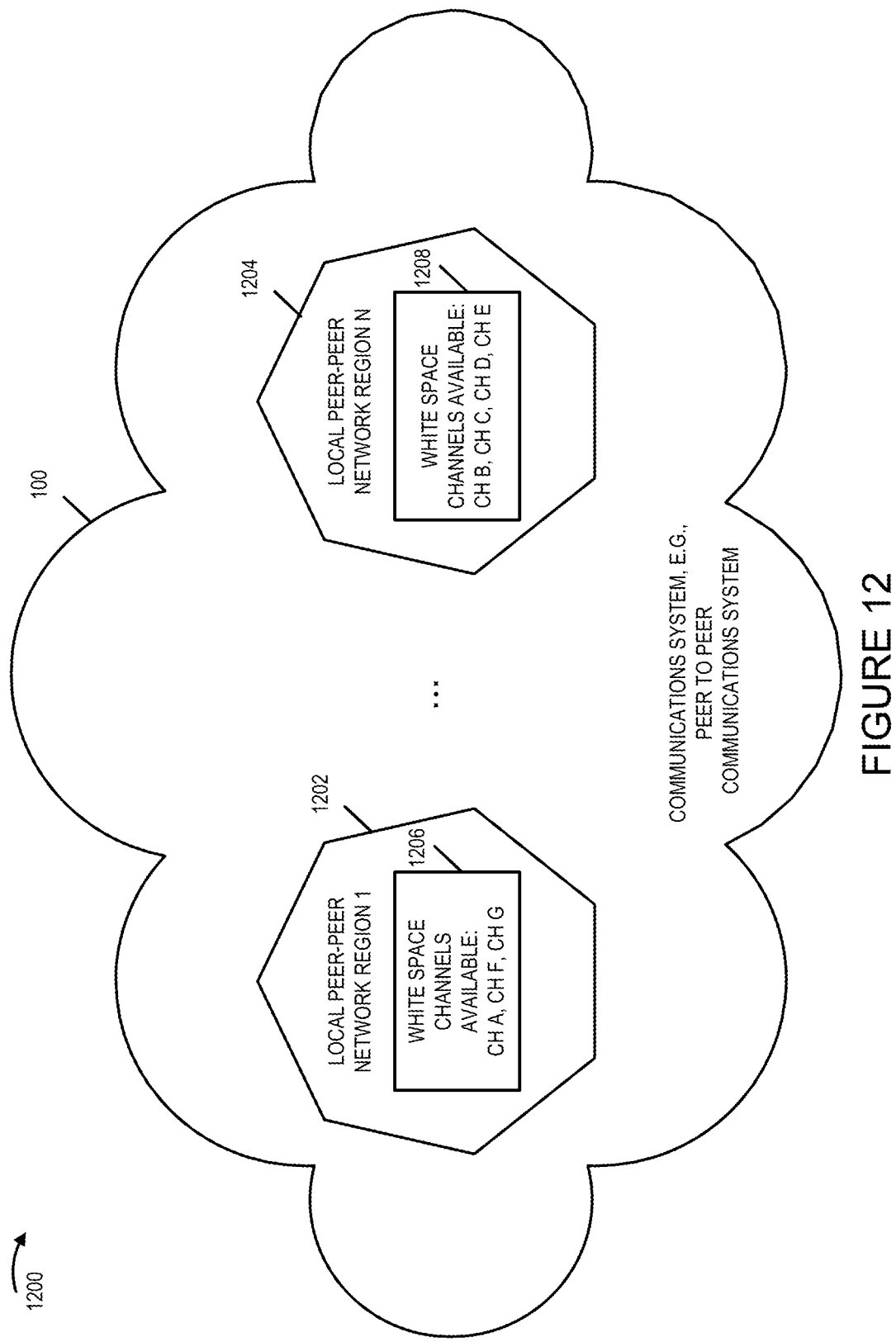
FIG. 12 is a drawing illustrating that at different locations different white space channels may be available to be used for communications.

FIG. 12 is a drawing illustrating that at different locations different white space channels may be available for communications, e.g., for peer to peer communications. In the example of drawing 1200 in local peer to peer network region 1 1202 of exemplary communications system 100, the following white space channels are available for peer to peer communications: channel A, channel F and channel G, as indicated by block 1206. Continuing with the example, in local peer to peer network region N 1204 of exemplary communications system 100, the following white space channels are available for peer to peer communications: channel B, channel C, channel D and channel E, as indicted by block 1208. In some embodiments, a wireless communications device, receives information from another device, e.g., an access node, indicating which communications channels are available corresponding to a location and/or control slot timing information corresponding to the available channels. In some embodiments, a wireless communications device, determines on its own, e.g., based on monitoring which communications channels are available corresponding to a location. In some embodiments, a wireless communications device uses information from its monitoring in combination with received information to determine which channels are available at a location and/or determine control slot timing information.

Figure 13:
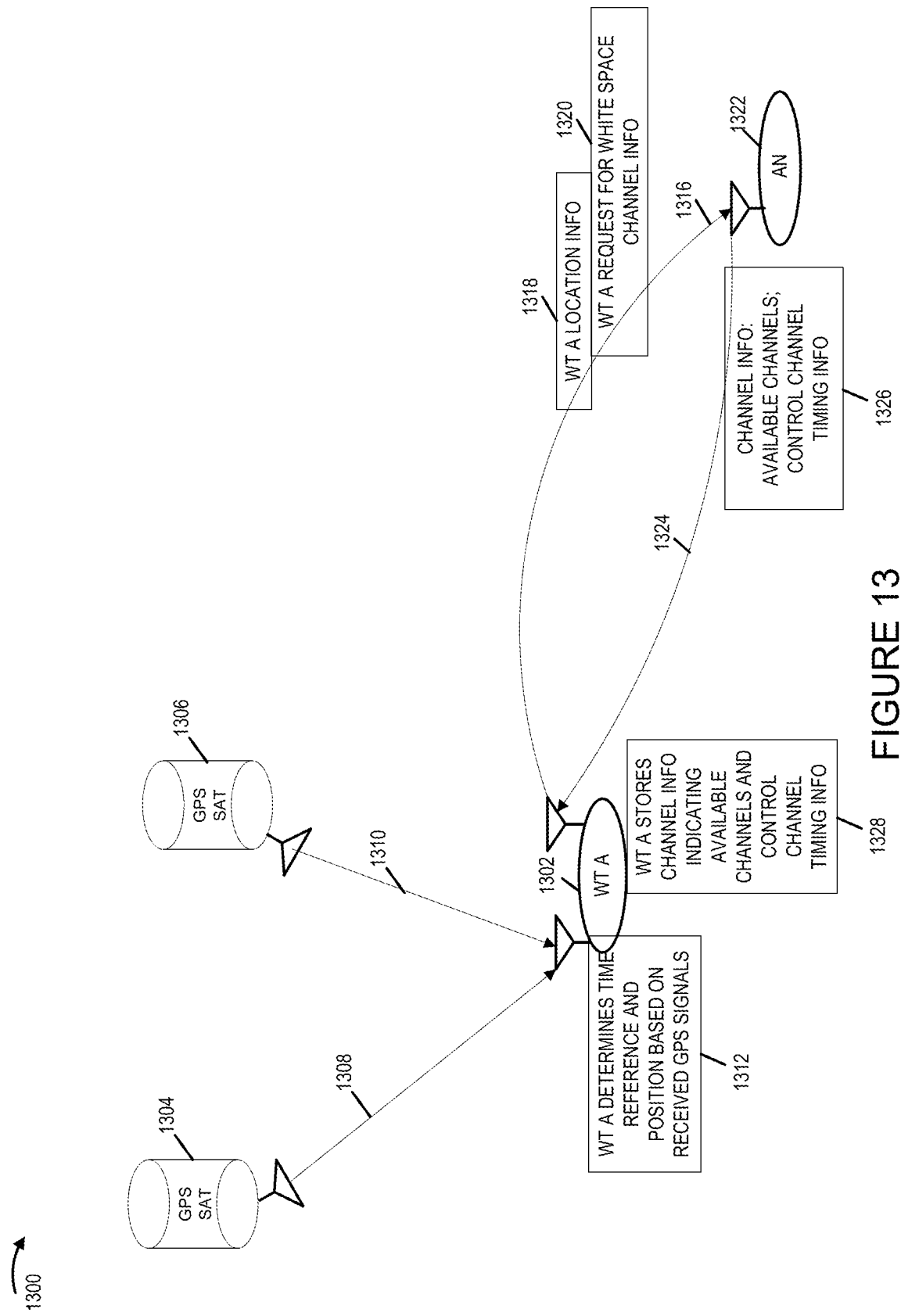
FIG. 13 is a first drawing in the Figure set sequence comprising FIGS. 13-15, which illustrate an example in which an exemplary wireless communications device implements a method in accordance with an exemplary embodiment.
Figure 14:
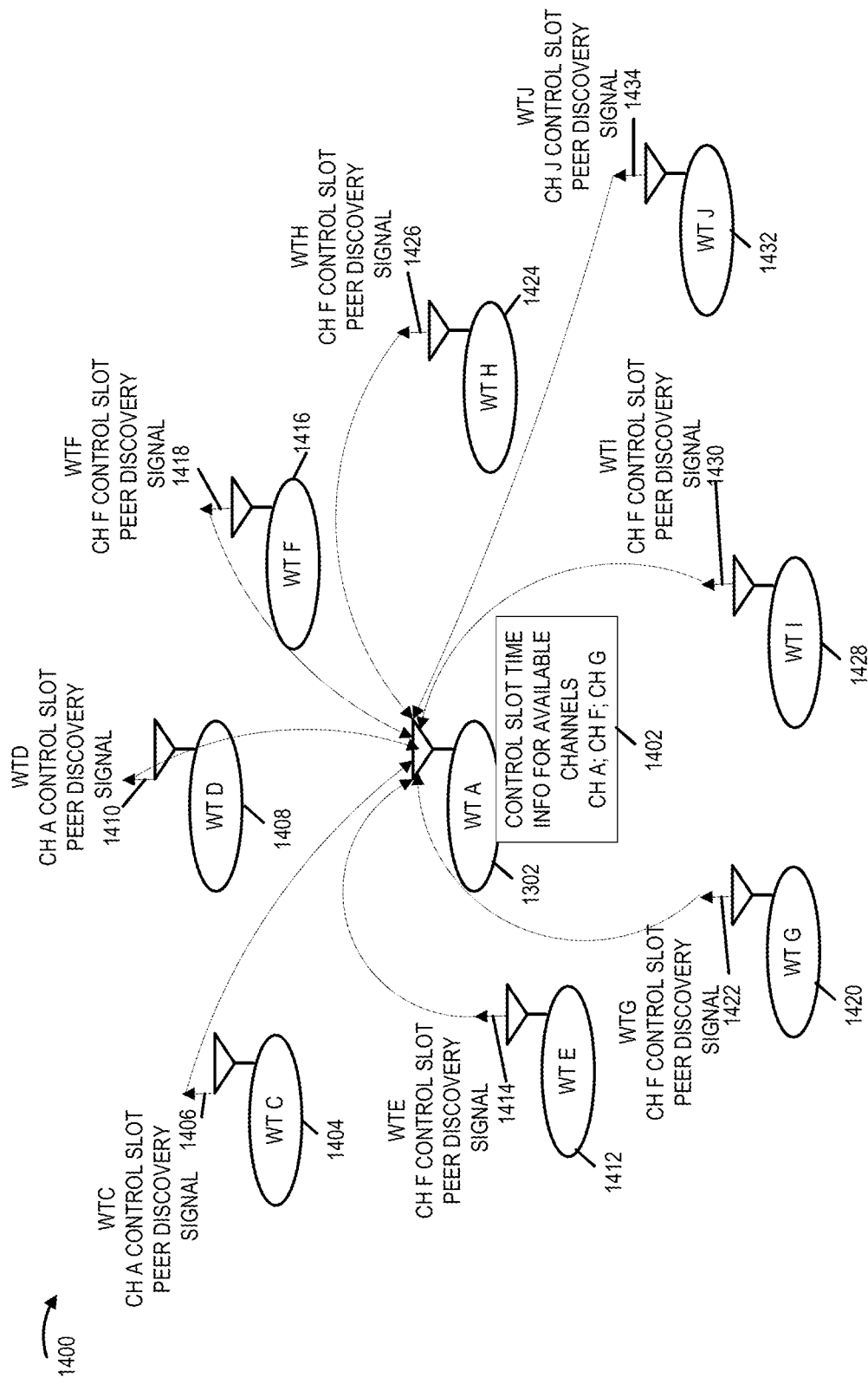
FIG. 14 is a second drawing in the Figure set sequence comprising FIGS. 13-15, which illustrate an example in which an exemplary wireless communications device implements a method in accordance with an exemplary embodiment.
Figure 15:
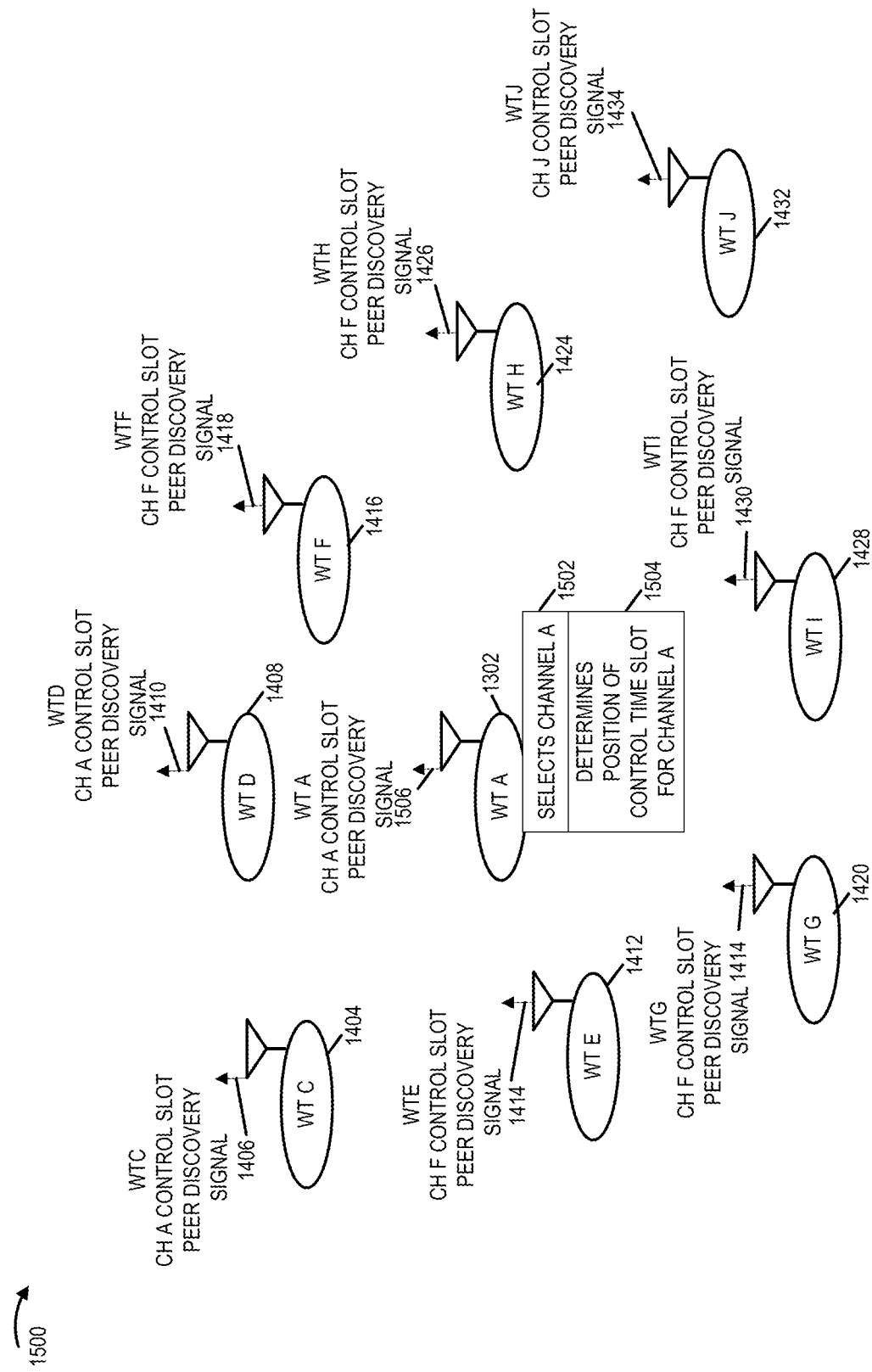
FIG. 15 is a third drawing in the Figure set sequence comprising FIGS. 13-15, which illustrate an example in which an exemplary wireless communications device implements a method in accordance with an exemplary embodiment.

FIGS. 13-15 illustrate an example in which a wireless communications device, e.g., WT A 1302, implements a method in accordance with an exemplary embodiment. In drawing 1300 of FIG. 13, exemplary wireless terminal A (WT A) 1302 receives GPS signals (1308, 1310) from GPS satellites (1304, 1306), respectively. WT A 1302 determines a time reference and its position based on the received GPS signals, as indicated by box 1312. WT A 1302 transmits signal or signals 1316 including WT A location information 1318 and a WT A request for white space channel information 1320 to access node 1322. Access node (AN) 1322 retrieves, e.g., from its memory, a local cache or from a remote node, e.g., an FCC database node mapping locations to available white space channels, and/or determines white space channel information corresponding to WT A's location. Access node 1322 generates and transmits signal or signals 1324 to WT A 1302 including channel information 1326. In this example, channel information 1326 includes a list of available channels that may be used for peer to peer communications and control channel timing information. In some embodiments, control channel timing information includes information identifying, for each available channel, information indicating one or more or all of: the position of the control slot in a predetermined recurring timing structure, the periodicity of control slots, the duration of control slots, hopping information pertaining to control slots. WT A 1302 receives the channel information 1326 and stores the channel information indicating available channels and control channel timing information, e.g., control slot timing information corresponding to the available channels, as indicated by block 1328.

In some other embodiments, WT A 1302 has control slot timing information corresponding to different possible channels and/or different possible channel/location combinations already stored in its memory and WT A 1302 receives available channel information from AN 1322 and uses the combination of the received information and its stored information to determine control slot timing information corresponding to the available channels.

In drawing 1400 of FIG. 14, WT A 1302 has stored control slot time information corresponding to the available channels (channels A, F and G) 1402 and uses that information in combination with its timing reference based on the received GPS signals, to determine when to monitor particular channels for control channels signals.

In one example, the control time slots corresponding to channel A, F and G are non-overlapping and are synchronized with respect to the GPS timing signals. For example, channels A, F and G may correspond to three of the exemplary channels in the timing structure of FIG. 6.

In this example, WT A 1302 detects: WT C channel A control slot peer discovery signal 1406 from WT C 1404 and WT D channel A control slot peer discovery signal 1410 from WT D 1408 while monitoring communications channel A during the communications channel A control time slot. WT A 1302 detects peer discovery signals (1414, 1418, 1422, 1426, 1430, 1434) from WTs (WT E 1412, WT F 1416, WT G 1420, WT H 1424, WT I 1428, WT J 1432), respectively, while monitoring communications channel F during the communications channel F control time slot. WT A 1302 does not detect any peer discovery signals while monitoring communications channel G during the communications channel G control time slot.

In FIG. 14 and FIG. 15, the relative position of the arrows representing the peer discovery signals has been used to indicate different control time slots. For example peer discovery signal 1406 which occurs in a channel A control time slot is placed in a leftmost position, while peer discovery signal 1418 which occurs in a channel F control time slot in placed in a center position.

In drawing 1500 of FIG. 15, WT A 1302 selects to use a communications channel A for communicating information as indicated by box 1502. In various embodiments, the selection of which channel to use is a function of one of more or all of: channel loading, channel conditions, interference levels detected, number of devices on a channel, free time on a channel, technologies being used on a channel, particular devices of interest detected on a channel, particular users of interest detected on a channel, amount of control slot air link resources associated with a channel.

Then, WT A determines the position of the control time slot corresponding to its selected communications channel, channel A, as indicated by box 1504. WT A transmits its peer discovery signal 1506 using channel A during the channel A control time slot. During some channel A control time slots, WT A monitors the channel A control time slot, e.g., to detect peer discovery signals from other devices. In various embodiments, during portions of a channel A control time slot in which WT A is not transmitting WT A monitors.

In one example, WT 1302 of FIG. 13-15 is any one of the wireless communications devices of system 100 of FIG. 1. WT A 1302 is, e.g., WT 300 of FIG. 3 which implements a method in accordance with flowchart 200 of FIG. 2, which includes steps 202, 204, 206, 208, 214, 216, and 222.

Figure 16:
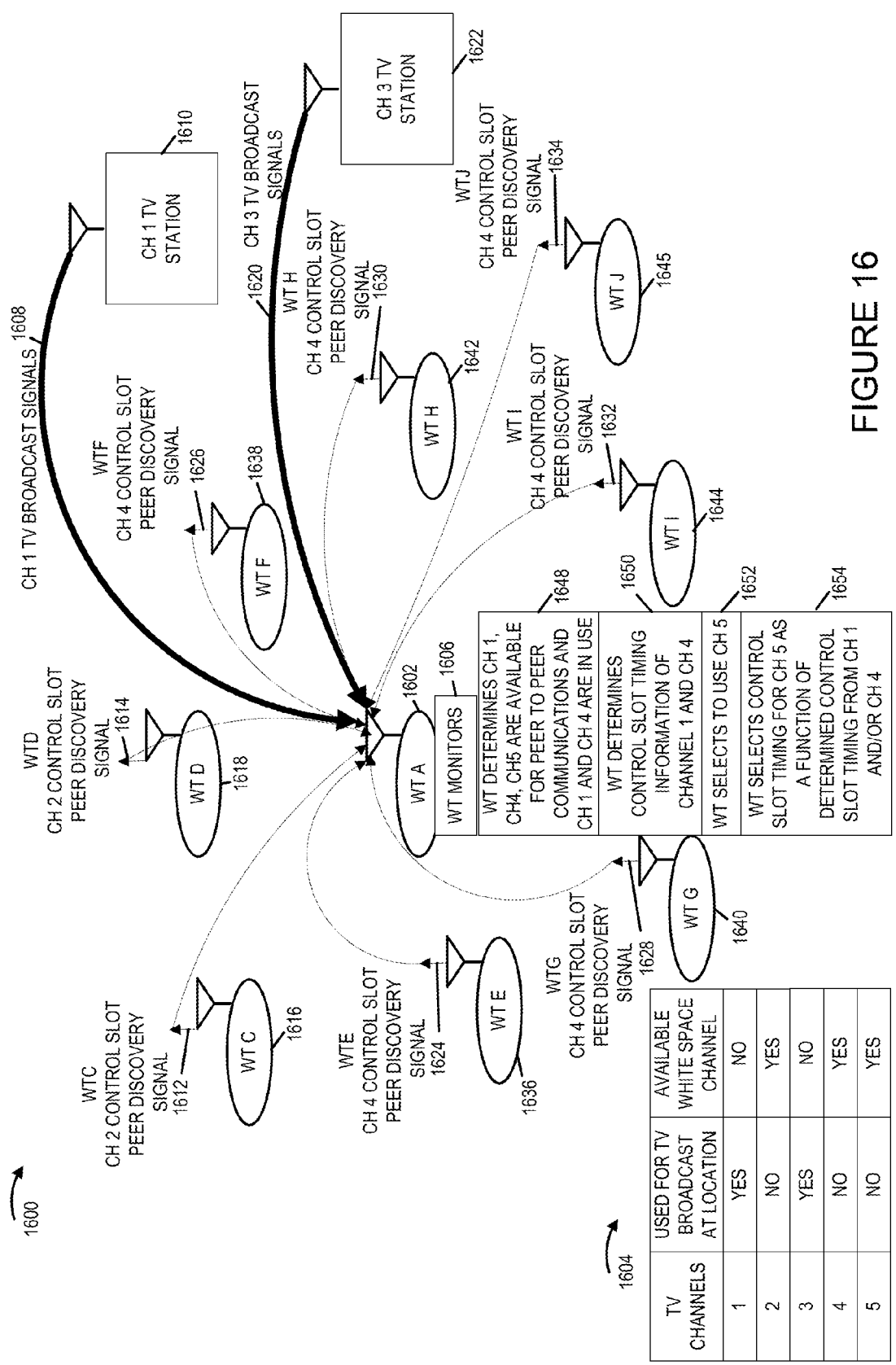
FIG. 16 is a first drawing in the Figure set sequence comprising FIGS. 16-18 which illustrate another example in which a wireless terminal implements a method in accordance with an exemplary embodiment.
Figure 17:
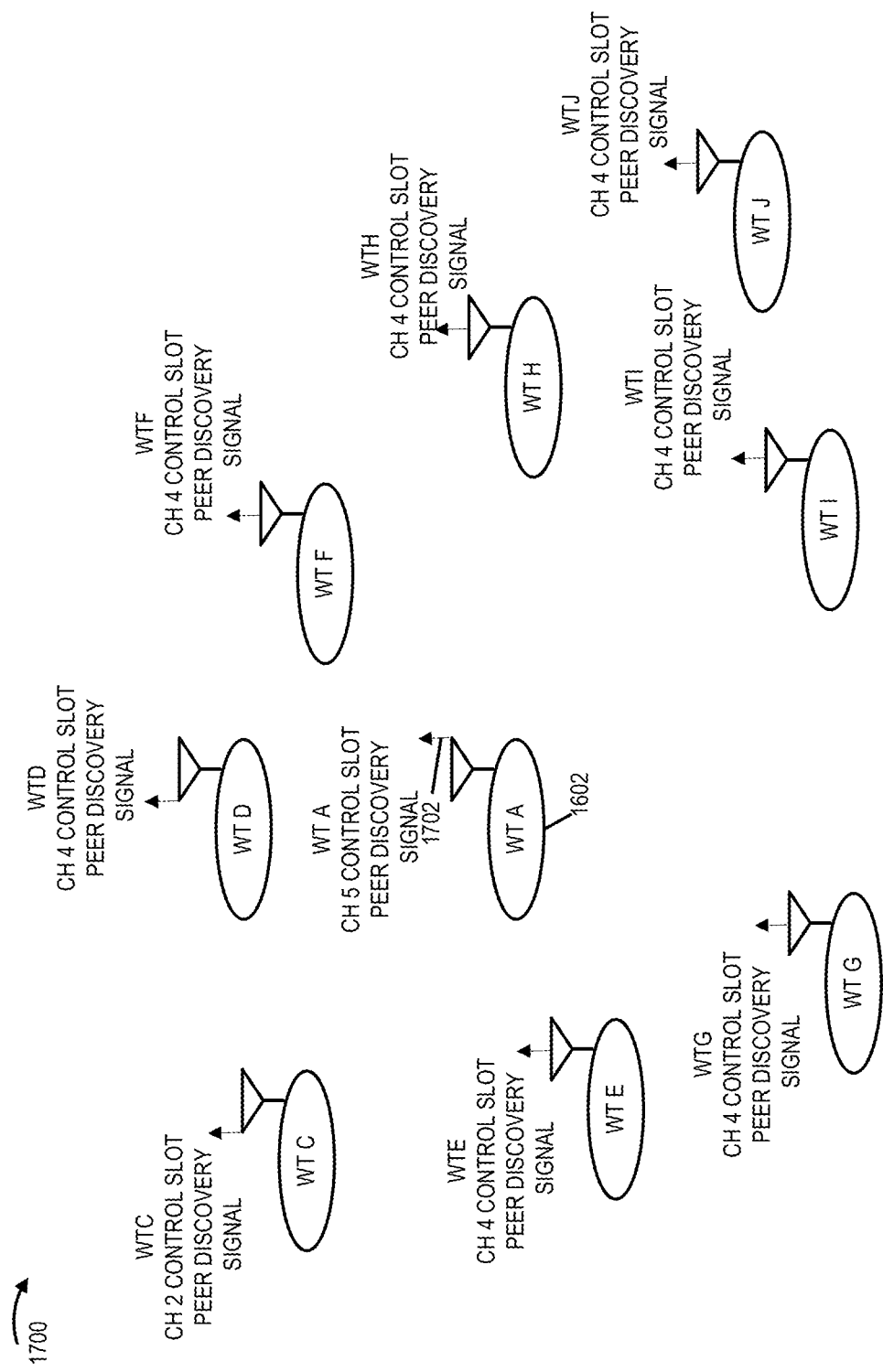
FIG. 17 is a second drawing in the Figure set sequence comprising FIGS. 16-18 which illustrate another example in which a wireless terminal implements a method in accordance with an exemplary embodiment.
Figure 18:
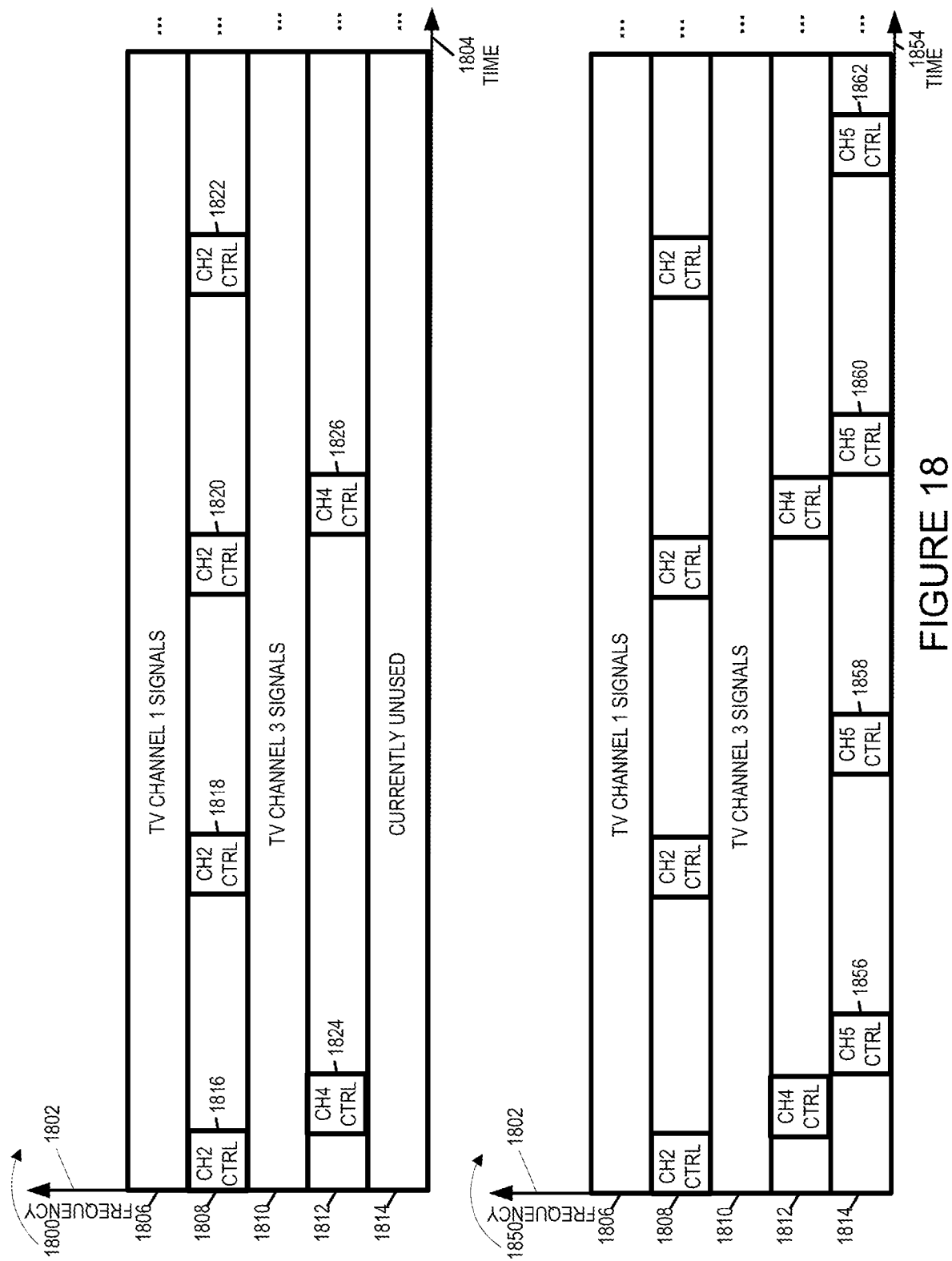
FIG. 18 is a third drawing in the Figure set sequence comprising FIGS. 16-18 which illustrate another example in which a wireless terminal implements a method in accordance with an exemplary embodiment.

FIG. 16-18 illustrate another example in which a wireless terminal, WT A 1602, implements a method in accordance with an exemplary embodiment. In this example, consider that there are five TV channels (channel 1, channel 2, channel 3, channel 4, and channel 5), that channels 1 and 3 are being used at this location for broadcasting TV signals, and that channels 2, 4, and 5 are available white space channels at this location, as indicated by table 1604 of FIG. 16.

WT A 1602 shown in drawing 1600 of FIG. 16 monitors each of the channels (1, 2, 3, 4, and 5), as indicated by block 1606. WT A 1602 detects CH 1 TV broadcast signals 1608 from channel 1 TV station 1610 on channel 1. WT A 1602 detects channel 2 control slot peer discovery signals (1612, 1614) from WTs (WT C 1616, WT D 1618), respectively while monitoring channel 2. WT A 1602 detects CH 3 TV broadcast signals 1620 from channel 3 TV station 1622 on channel 3. WT A 1602 detects channel 4 control slot peer discovery signals (1624, 1626, 1628, 1630, 1632, 1634) from WTs (WT E 1636, WT F 1638, WT G 1640, WT H 1642, WT I 1644, WT J 1646), respectively while monitoring channel 4. WT A 1602 does not detect any TV signals or peer discovery signals while monitoring channel 5.

Based on the detected information from the monitoring, WT A 1602 determines that CH 1, CH 4 and CH 5 are available for peer to peer communications and that channel 1 and channel 4 are currently in use, as indicated by block 1648. Based on the received signaling, e.g., the received peer discovery signals, WT A 1602 determines control slot timing information of channel 1 and channel 4, as indicated by block 1650. In this example, WT A 1602 selects to use CH 5, as indicated by block 1652. For example, consider that WT A 1602 has determined, based on detected signals, that peer to peer networks are currently operating on channels 1 and channel 4 using technologies that are not supported by WT A. As another scenario, consider that the peer to peer network on channel 1 is using a technology that is not supported by WT A 1602 and that channel 4 is currently very highly loaded.

WT A 1602 selects control slot timing for channel 5 as a function of the determined control slot timing from channel 1 and/or channel 4, as indicated by block 1654.

In drawing 1700 of FIG. 17, wireless terminal A 1602 transmits its peer discovery signals 1702 on channel 1 during channel 1 control slots. The other devices continue to transmit their peer discovery signals at the appropriate times, e.g., in the control time slot corresponding to the channel it is using, e.g., as previously shown and described with respect to FIG. 16.

Drawing 1800 of FIG. 18 illustrates frequency on the vertical axis 1802 vs time on the horizontal axis 1804. Five exemplary channels are illustrated (channel 1 1806, channel 2 1808, channel 3 1810, channel 4 1812, channel 5 1814). Drawing 1800 represents the conditions when WT A 1602 is monitoring the channels corresponding to FIG. 16. Channel 1 1806 is being used for TV signaling. Channel 2 is being used for a peer to peer network and includes channel 2 control time slots with corresponding channel 2 control time slot air link resources (1816, 1818, 1820, 1822), which are identified from the detected peer discovery signals. Channel 3 1810 is being used for TV signaling. Channel 4 is being used for a peer to peer network and includes channel 4 control time slots with corresponding channel 4 control time slot air link resources (1824, 1826), which are identified from the detected peer discovery signals. Channel 5 1814 is unused and available for peer to peer communications. Based on the received control times slot signals, e.g., the detected peer discovery signals, WT A 1602 determines control time slots for channels 2 and channel 4 and periodicity of control time slots for each channel.

Drawing 1850 of FIG. 18 illustrates the scenario after WT A 1602 has selected to use channel 5 and is transmitting its peer discovery signals in the channel 5 control timing slots as indicated in FIG. 17. Vertical axis 1802 represents frequency and horizontal axis 1854 represents time. In this example, WT A 1602 has selected control slot timing for channel 5 such that the channel 5 control time slots are non-overlapping with the control time slots of channel 2 and channel 4 and has selected to use the same periodicity as channel 2. Channel 5 control slot air link resources (1856, 1858, 1860, 1862) occur during channel 5 control time slots.

In one example, WT 1602 of FIG. 16-18 is any one of the wireless communications devices of system 100 of FIG. 1. WT A 1602 is, e.g., WT 300 of FIG. 3 which implements a method in accordance with flowchart 200 of FIG. 2, which includes steps 202, 208, 212, 214, 216, 218, 220 and 222.

Various features and/or aspects of some, but not necessarily all embodiments, are described below. In various embodiments the methods and/or apparatus provide a solution for time orthogonalizing various channels, e.g., control channels on different TV bands, e.g., unused TV bands at a location, to facilitate monitoring by white space devices. Examples of such control channels are:

Broadcast channels of WAN base stations or Wi-Fi access points;

peer discovery channels in a peer to peer system; and silence periods for primary signal detection.

Two exemplary approaches, in accordance with various embodiments are described below.

A first approach uses global synchronization, e.g., the devices are synchronized to a global timing source such as a GPS timing signal. In some such embodiments, dedicated time for each TV band is allocated to a control channel as a function of a TV Band ID and global time. Drawing 1900 of FIG. 19 illustrates one such assignment linked to global GPS time that can be derived either directly from GPS signals or through a CDMA base station. In this example, there are 30 channels, and each channel has a control channel time slot which is non-overlapping with the other channels. The duration and/or frequency allocation of a control time slot, in some embodiments, is fixed. In the example of FIG. 19 the control time slots have a fixed duration, 10 msec, and occur with a frequency of 1 control time slot per second per channel. The duration and/or frequency allocation of a control time slot, in some embodiments, is updated, e.g., over a slow time scale, e.g., using a centralized controller. In some embodiments, the centralized controller is a device including or coupled to an FCC database.

A second approach uses a distributed method for deciding on control channel duration and/or frequency for each TV Band. In this approach the devices need not be, and may not be synchronized to a global timing reference. The method involves monitoring each of the potentially available TV bands, before deciding on control channel duration and/or frequency for a given band. For example, consider that a device that wants to use Band 3, which it has determined is currently unused and available, the device monitors other available bands for control channel transmissions of other devices. For each band, other than Band 3, it will make a determination of control channel time position, duration and frequency of transmissions by other devices. Then, it will determine the transmission time position and frequency of transmission for Band 3 as a function of the monitored information from the other channels. In some embodiments, the device determines the time and position to use for the Band 3 control channel so as to minimize control channel time overlap with other devices, e.g., other cognitive devices, using different TV bands.

In some embodiments, two or more contiguous channels can, and sometimes do, share the control channel time duration since simultaneous monitoring of contiguous channels may be feasible and advantageous. Drawing 2000 of FIG. 20 illustrates an example, corresponding to the first approach in which 2 contiguous bands share common control channel times, in accordance with an exemplary embodiment. In the example of FIG. 20, bands 1 and 2 are adjacent bands which share a common control channel time slot, bands 3 and 4 are adjacent bands which share a common control time slot, and bands 29 and 30 are adjacent bands which share a common control time slot.

With the second approach, in some embodiments, multiple contiguous bands may, and sometimes do, share common control channel time durations. For example, two adjacent bands, in some embodiments, may, and sometimes do, use the same control time slot.

In various embodiments a wireless terminal, e.g., wireless terminal 300 of FIG. 3, includes a module corresponding to each of the individual steps and/or operations described with regard to any of the Figures in the present application and/or described in the detailed description of the present applications. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless terminal, comprising:
   selecting from a plurality of communications channels a first communications channel for use in communicating information, said first communications channel corresponding to a first frequency band;
   determining a position of a first control time slot to be used on the first communications channel, said determined position of the first time slot at least partially overlapping a position of a second control time slot used on a second communications channel corresponding to a second frequency band, said second frequency band being adjacent the first frequency band, said second communications channel being one of said plurality of channels, said first control time slot being at least partially non-overlapping with regard to a third control time slot used on a third communications channel in said plurality of communications channels; and
   performing at least one of transmitting and monitoring on said first communications channel during said first control time slot.

2. The method of claim 1, further comprising:
   storing information indicating a predetermined relationship between the position of each individual control time slot in a predetermined recurring time period and each individual corresponding channel in said plurality of communications channels, said information indicating different control time slot start times for at least some of the different channels in said plurality of communications channels.

3. The method of claim 1, wherein the first and second control time slots used for said first and second frequency bands, which are adjacent frequency bands, fully overlap.

4. The method of claim 1, wherein the control time slots hop within a predetermined recurring time period according to a predetermined pattern based on the communications channel to which the control time slots correspond.

5. The method of claim 1, wherein said first and second control time slots overlap by at most 25%.

6. The method of claim 1, further comprising:
   concurrently monitoring, using a wideband receiver, multiple channels corresponding to adjacent frequency bands for control information, the control time slots of said concurrently monitored adjacent channels occurring at the same time or at least partially overlapping in time.

7. The method of claim 6,
   wherein said first and second control time slots fully overlap in time and correspond to a first pair of channels that includes said first communications channel and said second communications channel; and
   wherein said first and second control time slots do not overlap said third control time slot and a fourth control time slot which correspond to a second pair of channels, said second pair of channels including said third communications channel corresponding to a third frequency band which is adjacent said second frequency band.

8. The method of claim 7,
   wherein said first and second communications channels correspond to TV frequency bands 1.

9. The method of claim 1, further comprising:
   monitoring at least one of said plurality of communications channels;
   determining, from information obtained from said monitoring, the periodicity of control time slots on one of said plurality of communications channels; and
   selecting a periodicity to be used for control time slots on the first communications channel based on the determined periodicity.

10. A wireless terminal, comprising:
   means for selecting from a plurality of communications channels a first communications channel for use in communicating information, said first communications channel corresponding to a first frequency band;
   means for determining a position of a first control time slot to be used on the first communications channel, said determined position of the first control time slot at least partially overlapping a position of a second control time slot used on a second communications channel corresponding to a second frequency band, said second frequency band being adjacent the first frequency band, said second communications channel being one of said plurality of channels, said first control time slot being at least partially non-overlapping with regard to a third control time slot used on a third communications channel in said plurality of communications channels; and
   means for performing at least one of transmitting and monitoring on said first communications channel during said control time slot.

11. The wireless terminal of claim 10, further comprising:
   means for storing information indicating a predetermined relationship between the position of each individual control time slot in a predetermined recurring time period and each individual corresponding channel in said plurality of communications channels, said information indicating different control time slot start times for at least some of the different channels in said plurality of communications channels.

12. The wireless terminal of claim 10, wherein the first and second control time slots used for said first and second frequency bands, which are adjacent frequency bands, fully overlap.

13. The wireless terminal of claim 10, wherein the control time slots hop within a predetermined recurring time period according to a predetermined pattern based on the communications channel to which the control time slots correspond.

14. The wireless terminal of claim 10, wherein said first and second control time slots overlap by at most 25%.

15. A computer program product for use in a wireless terminal, the computer program product comprising:
a non-transitory computer readable medium comprising:
code for causing at least one computer to select a first communications channel from a plurality of communications channels for use in communicating information, said first communications channel corresponding to a first frequency band;
code for causing said at least one processor to determine a position of a first control time slot to be used on the first communications channel, said determined position of the first control time slot at least partially overlapping a position of a second control time slot used on a second communications channel corresponding to a second frequency band, said second frequency band being adjacent the first frequency band, said second communications channel being one of said plurality of channels, said first control time slot being at least partially non-overlapping with regard to a third control time slot used on a third communications channel in said plurality of communications channels; and
code for causing said at least one processor to perform at least one of transmitting and monitoring on said first communications channel during said first control time slot.

16. A wireless terminal comprising:
at least one processor configured to:
select a first communications channel from a plurality of communications channels for use in communicating information, said first communications channel corresponding to a first frequency band;
determine a position of a first control time slot to be used on the first communications channel, said determined position of the first control time slot at least partially overlapping a position of a second control time slot used on a second communications channel corresponding to a second frequency band, said second frequency band being adjacent the first frequency band, said second communications channel being one of said plurality of channels, said first control time slot being at least partially non-overlapping with regard to a third control time slot used on a third communications channel in said plurality of communications channels; and
perform at least one of transmitting and monitoring on said first communications channel during said first control time slot; and
memory coupled to said at least one processor.

17. The wireless terminal of claim 16, wherein said at least one processor is further configured to: store information indicating a predetermined relationship between the position of each individual control time slot in a predetermined recurring time period and each individual corresponding channel in said plurality of communications channels, said information indicating different control time slot start times for at least some of the different channels in said plurality of communications channels.

18. The wireless terminal of claim 16, wherein the first and second control time slots used for said first and second frequency bands, which are adjacent frequency bands, fully overlap.

19. The wireless terminal of claim 16, wherein the control time slots hop within a predetermined recurring time period according to a predetermined pattern based on the communications channel to which the control time slots correspond.

20. The wireless terminal of claim 16, wherein said first and second control time slots overlap by at most 25%.

* * * * *